US 6,718,425 B1

(12) United States Patent
Pajakowski et al.

(10) Patent No.: US 6,718,425 B1
(45) Date of Patent: Apr. 6, 2004

(54) HANDHELD COMPUTER BASED SYSTEM FOR COLLECTION, DISPLAY AND ANALYSIS OF ENGINE/VEHICLE DATA

(75) Inventors: Andrew J. Pajakowski, Columbus, IN (US); Jon E. Krutulis, Greenwood, IN (US); Alex Knight, Columbus, IN (US); Michael W. Phillips, Columbus, IN (US); Michael Kimball, Columbus, IN (US); Lee Gene Shipman, Columbus, IN (US); Joe Beitzinger, Cincinnati, OH (US)

(73) Assignee: Cummins Engine Company, Inc., Columbus, IN (US)

( * ) Notice: Subject to any disclaimer, the term of this patent is extended or adjusted under 35 U.S.C. 154(b) by 356 days.

(21) Appl. No.: 09/583,892

(22) Filed: May 31, 2000

(51) Int. Cl.[7] ........................... G06F 13/36; G06F 13/00
(52) U.S. Cl. ....................................... 710/315; 710/303
(58) Field of Search ........................... 710/315; 701/29, 701/35; 340/431

(56) References Cited

U.S. PATENT DOCUMENTS

| | | |
|---|---|---|
| 5,050,080 A | 9/1991 | Abe |
| 5,540,092 A | 7/1996 | Handfield et al. |
| 5,550,715 A | 8/1996 | Hawkins |
| 5,586,130 A | 12/1996 | Doyle |
| 5,648,898 A | 7/1997 | Moore-McKee et al. |
| 5,693,876 A | 12/1997 | Ghitea, Jr. et al. |
| 5,727,202 A | 3/1998 | Kucala |
| 5,731,516 A | 3/1998 | Handfield et al. |
| 5,737,215 A | 4/1998 | Schricker et al. |
| D397,679 S | 9/1998 | Hawkins et al. |

(List continued on next page.)

OTHER PUBLICATIONS

PalmPilot™ Professional Handbook, 1997, pp. 1–71.*
Webpages from www.tescina.com, DataGet, 3 pages.
Webpages from www.tescina.com, Versid Module, 3 pages.

Primary Examiner—Paul R. Myers
(74) Attorney, Agent, or Firm—Nixon Peabody LLP; Tim L. Brackett, Jr.

(57) ABSTRACT

A novel and improved engine data system for collecting, displaying and analyzing engine/vehicle data is provided. The system have advantageously results in a more effective, convenient, portable and low cost method of monitoring and processing vehicle data. The vehicle data system includes a handheld computer containing operating system software adapted to operate the handheld computer in accordance with a data protocol different from a vehicle bus protocol and a handheld microprocessor for executing the operating system software. The system importantly includes an adapter for creating a data pathway between a vehicle bus connector and an external data port provided on the handheld computer which is physically incompatible with the engine bus connector. The adapter includes a data port connector for connection with the external data port, a bus compatible connector for connection with the engine bus connector, a battery power supply separate from the power supply of the handheld compuer and an adapter microprocessor powered by the battery power supply and connected via the data pathway with the bus compatible connector for protocol conversion of the data received from the engine bus. An engine data adapter system for creating a data pathway between the engine data bus and the handheld computer while determining the start and stop of messages received from the data bus and adding message identifiers to the engine data so as to minimize the required data processing by the handheld computer.

75 Claims, 20 Drawing Sheets

U.S. PATENT DOCUMENTS

| | | |
|---|---|---|
| 5,802,545 A | 9/1998 | Coverdill |
| 5,848,365 A | 12/1998 | Coverdill |
| 5,884,323 A | 3/1999 | Hawkins et al. |
| 5,890,080 A | 3/1999 | Coverdill et al. |
| 5,900,875 A | 5/1999 | Haitani et al. |
| 5,938,716 A | 8/1999 | Shutty et al. |
| 5,938,721 A | 8/1999 | Dussell et al. |
| 5,957,986 A | 9/1999 | Coverdill |
| 6,006,274 A | 12/1999 | Hawkins et al. |
| 6,034,686 A | 3/2000 | Lamb et al. |
| 6,064,299 A * | 5/2000 | Lesesky et al. ............. 340/431 |
| 6,161,007 A * | 12/2000 | McCutcheon et al. ...... 455/575 |
| 6,241,537 B1 * | 6/2001 | Tate et al. ............... 439/928.1 |

\* cited by examiner

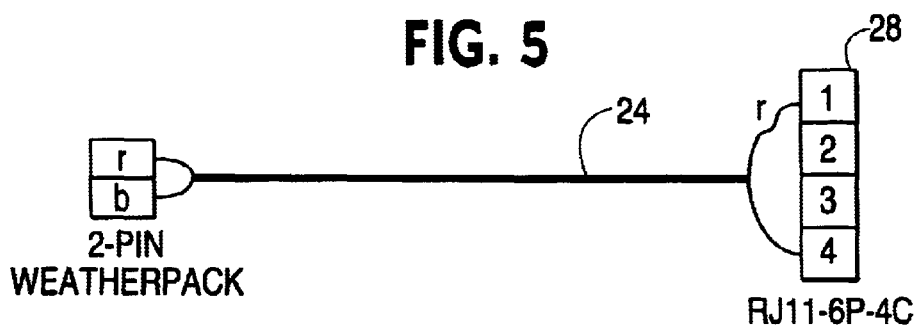
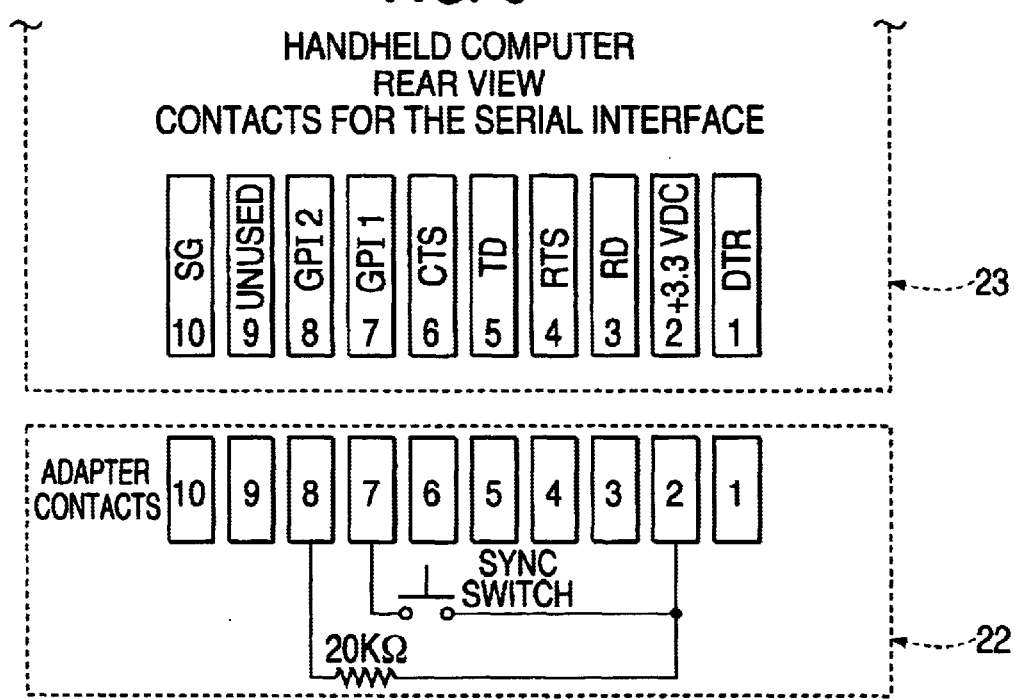

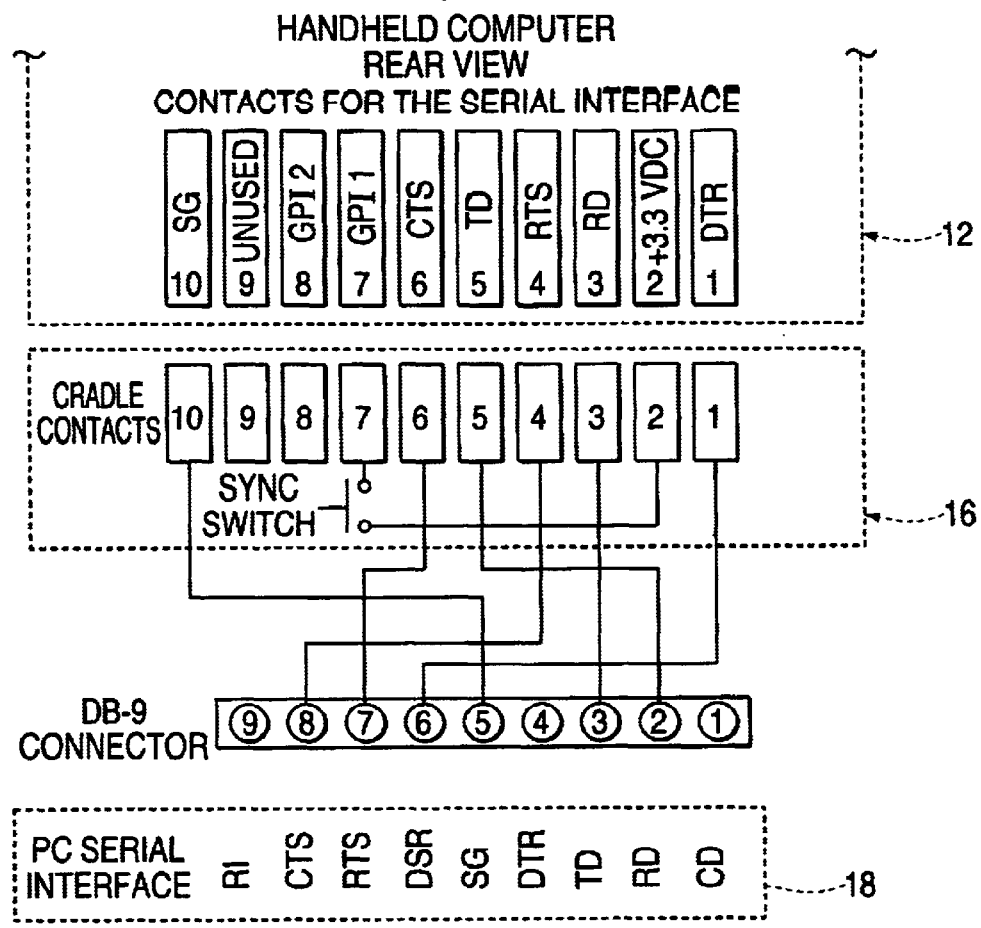
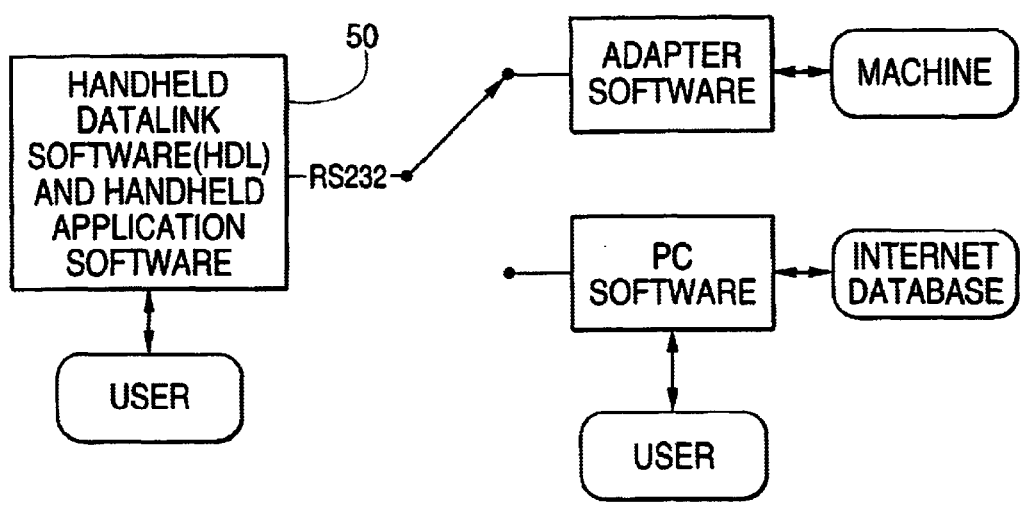

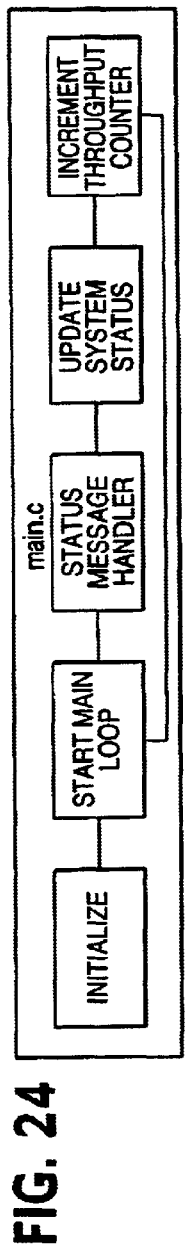
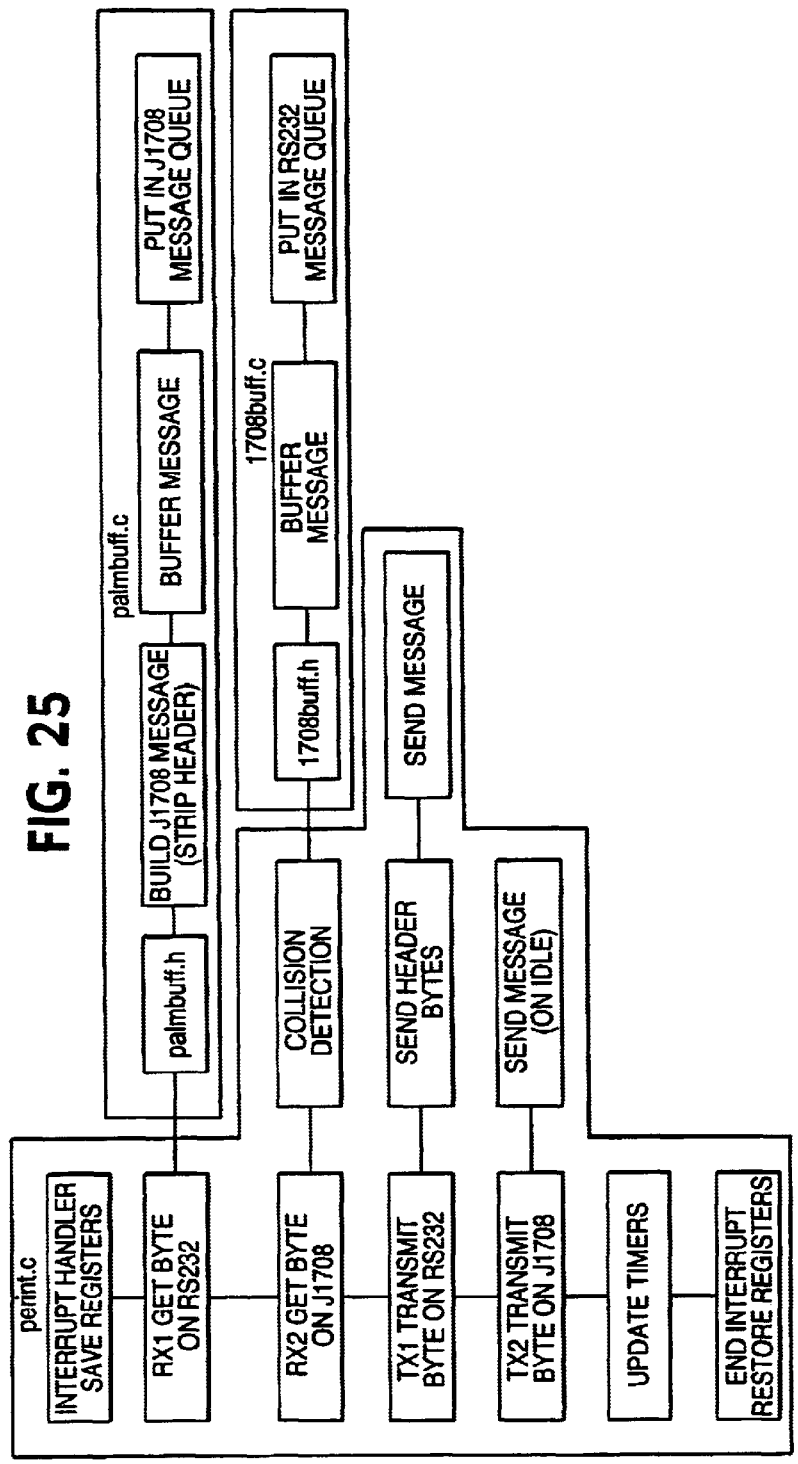
FIG. 24
FIG. 25

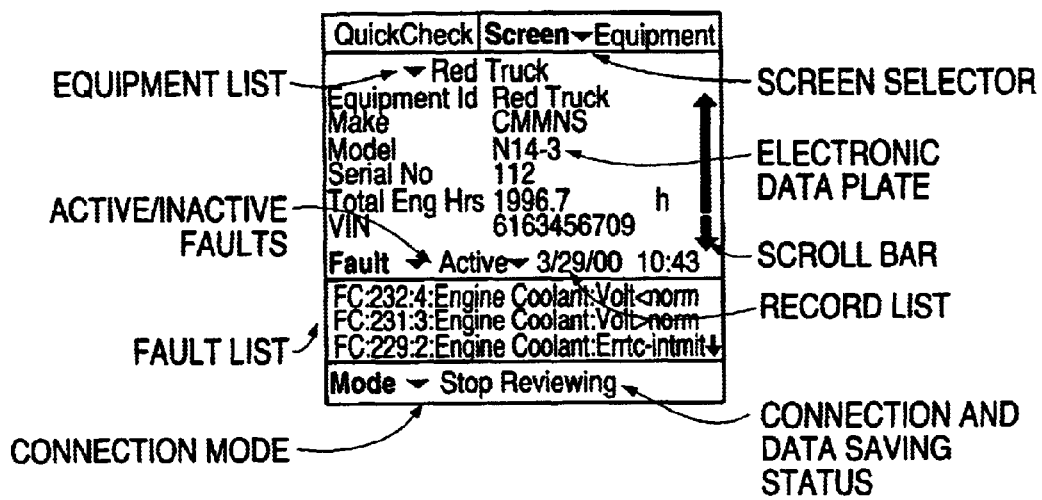

FIG. 29

| QuickCheck | Screen▼Equipment |
|---|---|

▼Red Truck
Equipment Id  Red Truck
Make          CMMNS
Model         N14-3
Serial No     112
Total Eng Hrs 1996.7      h
VIN           6163456709
Fault [Auto/Live/Stop/Save] e▼ 3/29/00 10:43
FC:23   e Coolant:Volt<norm
FC:23   e Coolant:Volt>norm
FC:22   e Coolant:Errtc-intmit↓
Mode ▼ Stop Reviewing FC:232:4:Engine Coolant:Volt<norm
FC:231:3:Engine Coolant:Volt>norm
FC:229:2:Engine Coolant:Errtc-intmit

FIG. 30

| QuickCheck | Screen▼Equipment |
|---|---|

▼Red Truck
Equipment Id  Red Truck
Make          CMMNS
Model         N14-3
Serial No     112
Total Eng Hrs 1996.7      h
VIN           6163456709
Fault [Active/Inactive] e▼ 3/29/00 10:43
FC:23   e Coolant:Volt<norm
FC:231:3:Engine Coolant:Volt>norm
FC:229:2:Engine Coolant:Errtc-intmit↓
Mode ▼ Stop Reviewing

FIG. 31
Trip Screen

| QuickCheck | Screen ▼ Trip | | |
|---|---|---|---|
| MaxRoadSpd | 65 | mph | |
| CruiseSetSpd | 65 | mph | ↑ |
| Total Idle Hrs | 3276.7 | h | |
| Total Idle Fuel | 6.8 | gal | |
| Total Veh Dist | 1019791.5 | mi | |
| Total Eng Hrs | 1996.7 | h | ↓ |
| Fault ▼ Active | | | |
| FC:228:1:Engine Coolant:Below Normal | | | |
| FC:229:2:Engine Coolant:Errtc-intmit | | | |
| FC:231:3:Engine Coolant:Volt>norm ↓ | | | |
| Mode ▼ Live | Communicating | | |

HANDHELD COMPUTER BASED SYSTEM FOR COLLECTION, DISPLAY AND ANALYSIS OF ENGINE/VEHICLE DATA

FIELD OF THE INVENTION

The present invention relates to a system and method which employ a handheld computer to collect, display and upload engine/vehicle data to a personal computer for analysis.

BACKGROUND OF THE INVENTION

The advantages and benefits associated with extracting, displaying and analyzing data from engine powered equipment, such as vehicles, is well recognized and accepted. Fleet operators can examine the accrued data to determine service needs and improper equipment utilization. Service personnel can use the collected information to identify the cause of any failure, to aid in diagnosis, to predict future failures, to schedule maintenance/repairs, and to correct any problems before an actual failure occurs. Such diagnosis and failure prediction are particularly pertinent to automobiles, trucks and static installations of engine powered equipment, such as diesel powered electrical generators, so that minor problems can be repaired before they lead to catastrophic failures and so that servicing can be scheduled during periods in which equipment will be least affected. Elaborate systems for collecting and intelligently analyzing the data have been developed as disclosed, for example, in U.S. Pat. No. 5,737,215 to Schricker et al..

Modern electronically controlled vehicles and engines, such as diesel truck engines, are typically equipped with a variety of electronic equipment including for example sensors, electronic fuel control systems, and on-board computer control modules all of which is interconnected by a shared communication path called a data link. Attempts have been made to standardize the protocol used by such data links. For example, the Society of Automotive Engineers (SAE) has adopted data link standards, such as J1708 and more recently J1939, that provide for serial data communication between microcomputer systems in heavy duty vehicle applications. SAE has also adopted a J1587 standard for electronic data interchange between microcomputer systems and heavy duty vehicle applications that specifies the format of data and messages communicated among microprocessors connected to a shared data link. U.S. Pat. No. 5,848,365 includes a fuller discussion of these standards.

A variety of techniques have been developed for the extraction, storage and analysis of data from vehicle data links. These techniques have included a variety of communication links including direct connections between the vehicle data links and portable computers having specialized software for downloading the data and displaying the data and storing it for subsequent uploading to desk top and networked computer systems for more detailed analysis and comparison. For the convenience of the system users, a variety of specialized portable computers has been developed to communicate with on-board vehicle electronics. For example, U.S. Pat. No. 5,050,080 to Abe discloses a diagnostic system including a portable diagnostic device adapted to be connected through an adapter harness with an on-board computer based system that is connected with a plurality of actuators for controlling various components of an engine, transmission, suspension system and other vehicular devices. The portable diagnostic device is custom built for the purposes for which it is intended which can add significantly to the cost per unit.

Handheld computers (also known as personal digital assistants) have become quite popular for a variety of functions relating to maintaining personal calendars, personal expenses, calculations, e-mail and other specialized functions. The popularity of these devices has led to high volume sales that has reduced their per unit development costs and allowed further reduction in prices that has fueled further their popularity. These devices are characterized by specialized display screens and memory configurations and often use stylus based operator input systems rather than key pads to reduce size and weight. To operate devices of this type in the most efficient manner and keep electrical power consumption to a minimum, specialized operating systems have been developed for handheld computers. One of the most popular operating systems is known as the PALM™ O/S operating system developed by 3Com. Various aspects of handheld computer systems developed by 3Com are disclosed in U.S. Pat. Nos. 5,727,202; 5,884,323; 5,900,875 and 6,006,274. Another operating system is known as WINDOWS CE™ developed by Microsoft Corporation. While these operating systems are suitable for the purposes intended, the data handling protocols established by these systems do not, without modification, handle other data protocols such as the SAE 1587 protocol. Moreover, the data port of a typical handheld computer (e.g. RS 232) is not compatible with the type of connector normally employed on a SAE 1708 or 1939 data link system.

Accordingly, the ubiquitous nature of handheld devices, their convenience, portability, low cost make them desirable as a device for assisting in the extraction, display and upload of engine/vehicle information for transfer, e.g. via the internet, for analysis but their specialized operating system, limited storage and computing capabilities, limited battery life and their limited porting capabilities make them less than ideal.

Attempts have been made to adapt a handheld computer for the purpose of collecting data. For example, Tescina, Inc. of Fremont, Calif. manufactures a DataGet™ product that allows the collection of gauge values using a Palm™ handheld computer, www.tescina.com. Data is ported from the handheld computer to a personal computer in Microsoft Access®, Microsoft Excel® or tab delimited text files. Tescina provides a data acquisition module consisting of an analog to digital circuit powered by a battery power source mounted in an adapter housing that attaches directly to the Palm™ handheld computer. However this system in no way suggests how to utilize a handheld computer to connect with a data link (such as a J1708 or J1939) to collect, display and upload in an efficient manner that does not require modification of the operating software that could interfere with the other functions for which the operating software of the handheld device was designed.

SUMMARY OF THE INVENTION

The present invention is directed to an vehicle data system for processing and displaying vehicle data transmitted through a bus connector of a data bus on an electronically controlled engine operating in accordance with a predetermined bus protocol, comprising a handheld computer including memory for storing operating system software adapted to operate the handheld computer in accordance with a data protocol which is different from the vehicle bus protocol and an external data port which is physically incompatible with the bus connector of the data bus. The system also includes an adapter for creating a data pathway between the bus connector and the external data port wherein the adapter includes an adapter microprocessor connected via the data pathway with the bus connector for protocol conversion of the data received from the vehicle bus for processing by the handheld computer. The handheld computer may also include a handheld microprocessor for executing the operating system software. The external data port of the handheld computer is connected to the handheld microprocessor to allow the vehicle data when properly formatted to pass into the handheld computer. The adapter may also include a data port connector for connection with the external data port of the handheld computer, a bus compatible connector for connection with the bus connector, and a battery power supply separate from the power supply for the handheld computer and for the data bus. The adapter microprocessor may be supplied with power from the battery power supply.

The adapter may include a flexible cable having a bus compatible connector at one end and a cable connector at the other end, and an adapter housing capable of being affixed to the handheld computer when the data port connector is connected to the external data port. The adapter housing may include a cable compatible connector for engagement with the cable connector to complete the data pathway between the data bus and the adapter microprocessor. The data bus may transfer data messages containing information regarding the vehicle, including engine data and the adapter microprocessor may operate to convert the vehicle data between the bus protocol and the data protocol of the handheld computer. The adapter microprocessor may determine the start and stop of messages received from the data bus. The adapter microprocessor may further operate to add message identifiers to the vehicle data conveyed to the handheld computer through the external data port. The handheld computer may include application software for permitting detection of the message identifiers added to the vehicle data by the adapter microprocessor.

The present invention is also directed to an vehicle data adapter system for creating a data pathway between the bus connector of a data bus on an electronically controlled engine operating in accordance with a predetermined bus protocol to convey data messages and a handheld computer which operates in accordance with a data protocol which is different from the vehicle bus protocol wherein the handheld computer includes an external data port which is physically incompatible with the bus connector of the data bus. The vehicle data adapter system may include an adapter housing external to the handheld computer, an adapter microprocessor included in the data pathway between the data bus and the handheld computer and mounted within the adapter housing, an adapter memory for storing adapter software for implementation by the microprocessor to perform the functions of the adapter system including protocol conversion, a data port connector for connecting the data pathway with the external data port of the handheld computer to allow vehicle data to be transferred to and from the handheld computer, and a bus compatible connector for connecting the data pathway with the bus included in the data pathway for connection with the bus connector of the vehicle bus to allow vehicle data to be transferred to and from the vehicle bus. The adapter microprocessor operates to convert the vehicle data between the bus protocol and the data protocol of the handheld computer by determining the start and stop of the messages received from the data bus. The adapter microprocessor further operates to add message identifiers to the vehicle data conveyed to the handheld computer through the external data port, whereby the amount of processing required by the handheld computer for data monitoring and extraction from the data bus is minimized. The message identifier may include a delimiting header block having a synchronization sequence and a message length. Data link software may also be provided for monitoring selected information for example, regarding engine operating conditions and vehicle information relating to the vehicle in which the engine is mounted. The system may further include application software for causing the handheld computer to function to provide one or more of the following functions: display engine operating conditions, display related vehicle information, display fault information and to allow for change of data and for managing the data storage structure. The system may also include conduit software for transferring data to and from the handheld computer and a personal computer.

The present invention is also directed to a method for creating a data pathway between (1) a data bus on an electronically controlled engine having a first electrical power source which data bus operates in accordance with a predetermined bus protocol to convey multi byte data messages of varying length and (2) a handheld computer having a second electrical power source separate from the first which operates in accordance with a data protocol which buffers received bytes of data for access by application software without keeping track of when the bytes are received thereby losing indications of the start and stop of multi byte data messages, comprising interconnecting the data bus and the handheld computer to form the data pathway external to both the data bus and the handheld computer to allow multi byte data messages of varying length to pass between the handheld computer and the data bus, intercepting the messages conveyed on the data pathway from the data bus to the handheld computer at a point external to the data bus and the handheld computer, buffering the data contained in the intercepted messages external to the data bus and the handheld computer, processing the buffered data to determine the start and stop of messages received from the data bus, adding message identifiers to the buffered data as the messages are conveyed to the handheld computer to identify the start and stop of each message, providing an electrical power source separate from the first and second power sources and performing the intercepting, buffering, processing and adding steps utilizing the electrical power source, whereby the amount of processing that the handheld computer is required to undertake for data monitoring and extraction from the data bus is reduced without employing the electrical power sources of either the handheld computer or the engine.

BRIEF DESCRIPTION OF THE DRAWINGS

FIG. 5 illustrates the adapter cable of the adapter of the present invention;

FIG. 6 is a schematic of the adapter/handheld computer interface;

FIG. 7 is a schematic of the handheld computer/cradle/PC interface;

FIG. 8 is a diagram illustrating the highest level software component architecture of the present invention;

FIG. 24 is a diagram illustrating the main program loop of the adapter software;

FIG. 25 is a block diagram illustrating the organization of the adapter software communication logic;

FIG. 27 is a sample screen shot of Equipment Screen in QuickCheck© application.

FIG. 28 is a sample screen shot of Screen Selector feature in QuickCheck© application.

FIG. 29 is a sample screen shot of Connect Mode screen in QuickCheck© application.

FIG. 30 is a sample screen shot of Active/Inactive Faults screen in QuickCheck© application.

FIG. 31 is a sample screen shot of Trip Screen in QuickCheck© application.

DETAILED DESCRIPTION OF THE INVENTION

Figure 1:
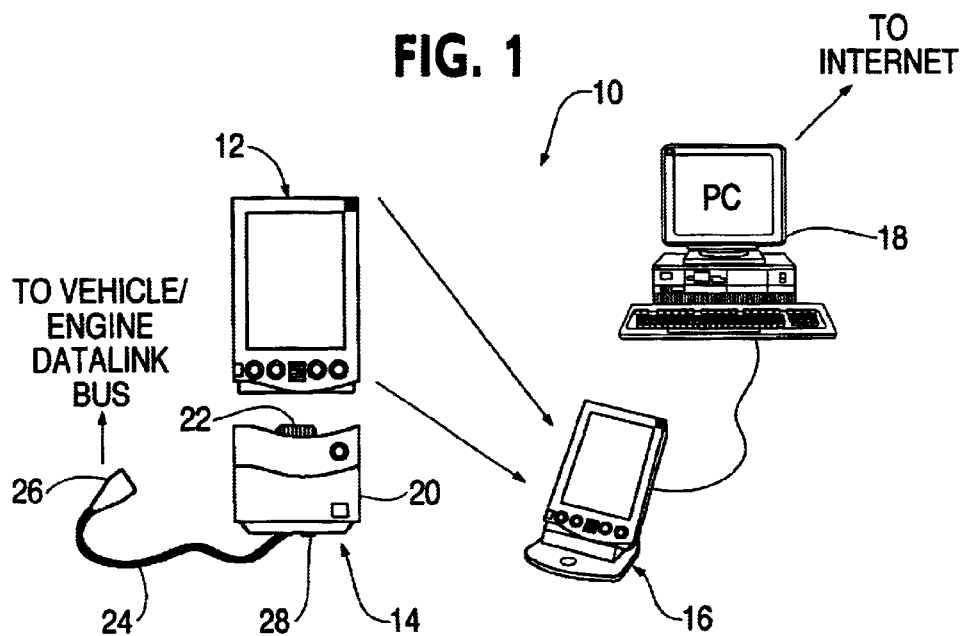
FIG. 1 is a diagrammatic illustration of the major components of the vehicle data system of the present invention.

As shown in FIG. 1, the vehicle data system 10 of the present invention is defined by four primary system components: a handheld computer 12, such as a Palm Pilot® device, an adapter system 14, a handheld computer cradle 16 and a personal computer (PC) 18. In addition, there are four primary component interfaces: the adapter interface with the vehicle data bus (e.g. J1587), the adapter interface with the handheld computer, the PC interface (between the handheld computer and the PC) and the internet interface which connects the PC database to the internet. Finally, there are two user interfaces: the handheld computer user interface and the PC support utility user interface.

The handheld computer 12 and adapter 14 are portable devices that can be used to inspect and maintain remote equipment (such as at a construction site or a mining site). The collected data can then be returned to the operations center where it is uploaded to PC 18 for advanced analyses. When the PC is properly configured, the data transfer will occur with a single button-press on the handheld computer cradle. The database will be able to support data transfers from multiple handheld computers for applications that require multiple collection units. The system 10 may also function to allow users to transfer data to a server for storage and analysis via internet connectivity.

Specifically, the handheld computer 12 is utilized for the monitoring, extracting, processing and displaying standard (i.e. that defined in supported SAE standards) vehicle data. This includes the ability to monitor data broadcasts, fault information, and standard engine/vehicle information that can be obtained through the utilization of selected SAE protocols (such as J1587). This also includes the ability to capture snapshots of vehicle information, such as engine hours, fuel used, and idle time, that can later be transported to a central database for more advanced business analysis. It should be noted that the present system is capable of extracting a variety of vehicle data relating to various vehicle systems, such as anti-lock brake data, transmission data, etc. Thus vehicle data is defined herein as including but not limited to engine data. Also, the present system can be used to collect, display and analyze vehicle information that can be obtained through the utilization of SAE protocols/datalinks for passenger cars, such as SAE J1850 VPW (variable pulse-width modulation) communication device; SAE J1850 PWM (pulse-width modulation) communications device; ISO 9141 communications device; SAE J2284 (high-speed CAN bus) communications device; and single wire CAN (SAE J2411). For applications which do not utilize supported data link protocols, the handheld computer will manage custom checklist entries in order to provide electronic forms for convenient data collection. These forms can periodically be consolidated onto a central database for long-term record storage The adapter system 14 of the present invention functions to provide an interface or data pathway from the vehicle (or engine) datalink/bus to the handheld computer 12. That is, the adapter 14 provides a physical link between a vehicle bus connector and an external data port which is physically incompatible with the bus connector. This physical connection is accomplished using an adapter housing 20 having a data port connector 22 for connecting with an external data port 23 on handheld computer 12, and a flexible cable 24 having an vehicle bus compatible connector 26 at one end for connecting with an vehicle bus connector. Flexible cable 24 also includes a cable connector 28, i.e. 4-pin modular phone style plug (RJ11), at an opposite end for engaging a complimentary cable compatible connector on the adapter housing 20. The adapter 14 also functions to convert the vehicle data between an vehicle bus protocol and a handheld computer data protocol which is different from the vehicle bus protocol to permit effective data monitoring and extraction from the data bus. Using standard protocols, then, the handheld computer will be able to extract information from engine/vehicle electronics. The protocols that will be supported by the product are J1708 (J1587) and J1939.

Figure 2:
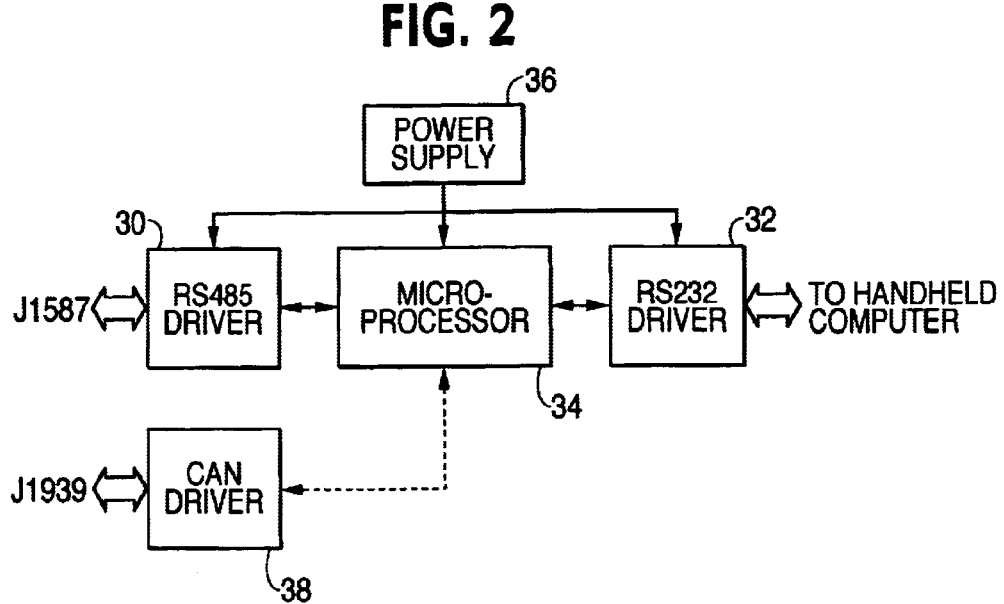
FIG. 2 is a block diagram illustrating the primary components of the adapter system of the present invention.

FIG. 2 illustrates the primary components of the adapter system including a RS485 driver 30, a RS232 driver 32, microprocessor 34, power supply 36 and housing 20 (FIG. 1). The RS485 driver provides support for the J1708 hardware protocol. Though this protocol is gradually being replaced by newer ones (primarily J1939/11), most industrial and automotive applications continue to support it. The RS232 driver provides the means of communication with the handheld computer. In the preferred embodiment, hardware handshaking is not utilized since the communication rate with many handhelds, for example the Palm Pilot, is at 9600 baud. This communication rate was selected to correspond to the J1708 rate so that the microprocessor (discussed hereinbelow) crystal speed could be minimized, thus minimizing the power consumption of the adapter unit. Added support of J1939 will require this speed to be increased, thereby making the use of hardware handshaking an option. Handheld computer documentation, such as that of the Palm Pilot, recommends the use of handshaking for communication speeds in excess of 19200 baud. A CAN driver 38 may also be used to provide support for J1939 communications.

The adapter microprocessor 34 provides the necessary firmware to encapsulate messages from the vehicle bus into a package that can be easily delimited by the handheld application software. The adapter microprocessor may be a PIC 17C756-08 microprocessor. The microprocessor's functions consist of buffering J1587 messages and passing them along in delimited packages to the handheld computer module. It also buffers messages from the handheld computer and ships them out onto the J1708 datalink during the next available time-slice. Additional functionality of the microprocessor includes the generation and transmission of a status message to the handheld computer that includes the following information: adapter battery level (voltage), communication errors, throughput measurement, buffer level, and firmware version number.

The PIC micro-controller is an 8 bit device which contains 16 Kbytes of program space (ROM) and 902 bytes of RAM. The initial adapter crystal runs at a rate of 4.9152 MHz (1.2288 MHz instruction rate). This rate is used to minimize power consumption of the adapter and still meet the minimum required clock frequency for 9600 baud serial communications.

The datalink adapter 14 is powered via two 1.5 volt AAA alkaline batteries. The housing 20 which is utilized by the adapter unit has a built-in battery enclosure to support two AAA batteries. Since the J1708 interface requires 5 volts, a step-up converter is used to raise the source voltage to 5 volts. The adapter housing 20 may be an off-the-shelf housing, for example, provided by 3Com as a 'modem case' housing.

The adapter 14 of the present invention advantageously processes messages for effective use by the handheld computer 12 without the need to modify the handheld computer software. It should be noted that it is possible to provide a hardware adapter solution to convert J1708 communications to RS232 communications without the use of a microprocessor. However, the timing resolution for many handheld computer applications, such as Palm Pilot applications, does not allow for the detection of line idle time. As a result, the sophistication of the required parsing intelligence to determine message breaks would unreasonably burden a handheld computer not having already having this capability, thereby compromising time-to-market and amplifying the complexity of the handheld software. The preferred embodiment of the present adapter converts messages on an RS485 (J1708) vehicle data link to and from messages on an RS232 serial communications link, host computer. In this case, the necessary consideration is the physical (or hardware) layer of the two protocols. The existing solutions to this problem involve a straight conversion of message bytes from one protocol to the other. This means that the identical message stream delivered by the sending party is collected by the receiving party. The timing of these bytes may or may not be the same (the data links could be communicating at different rates.) For the J1587 protocol (a protocol that runs on the J1708 data link), this straight conversion is problematic because message termination is determined by an idle time during which no bits are transmitted on the data link. It becomes necessary, then, for the party receiving the converted J1587 message (host computer) to determine the message divisions (start and stop of the messages) from a continuous stream of message bytes. This determination can be achieved in two known ways without altering the message format.

The message can be constructed utilizing checksum analysis algorithms;

The message can be constructed by maintaining an inter-byte timing ratio between distinct messages that can then be detected by the receiver. That is, a break between the messages is detected to determine the end of the message.

With respect to checksum analysis, J1708 messages come with a checksum which is a means for validating the message contents. Once the initial message boundary is identified, this technique utilizes an algorithm which constantly sums the bytes and compares the result with the next byte. If it matches, the receiver assumes the message to be terminated. This method has three major shortcomings. First of all, statistically the checksum will fail once in every 250 messages, resulting in the loss of message synchronization. This is compounded by the fact that problematic sequences will repeatedly result in processing failures. The next problem involves finding the initial message division which is only simple if the application is looking for a particular Message ID (MID), which identifies the message sender and is found at the front end of J1587 messages.

With respect to interbyte timing ratio, the key element preventing the utilization of this method on the certain handheld computer platforms is that the handheld operating system (O/S), such as the Palm (O/S), handles the receiving of bytes into the RS232 communications port. It stuffs received bytes into a buffer that can then be accessed by applications. It does not, however, keep track of when the bytes are received so any indications of message divisions that were maintained via the data link conversion process are lost to the application. The only way around this is a low-level interception of the serial interrupt (hacking around the O/S) to replace the buffering done by the handheld computer O/S. This is technically difficult, itself, as it is an undocumented approach. Because of the microprocessor resources required to run-around the operating system, this "run-around", e.g. the hacks, may no longer work, and would likely have to be repeated, on new versions of the handheld computer O/S, thus raising the risks of non-compatibility on newer models of handheld computers.

Finally, no matter which method is used to detect divisions of messages coming into the handheld computer, data link conversions in the other direction are problematic because the handheld computer must have an indication of when the RS485 line has been idle long enough to send out a message. This requires one digital output and one digital input (directed at the appropriate hardware.) While the necessary I/O resources do exist, access to these lines is not available through the O/S, and as with timing analysis of incoming bytes, this requires difficult low-level manipulations.

The present system adopts a unique approach to simplify the quantification of messages. The protocol conversion process utilizes the adapter microprocessor to detect RS485 (J1708) message boundaries in real time (as it receives the messages.) The adapter microprocessor processes the vehicle data using interbyte timing ratio detection to perform the start/stop identification of a message. When it sends the messages out on the RS232 data link, though, it packages the messages with a delimiting header block (a unique message identifier) that includes a synchronization sequence and a message length. The software that resides on the handheld computer need only synchronize with the message stream using the synchronization sequence and then the length to easily construct the messages of the length revealed in the header. Finally, using the adapter to process, buffer and filter the datalink messages makes for a cleaner interface, and simplification of the handheld computer based software. This filtering allows lesser power devices, such as handhelds, to be able to be used as vehicle datalink readers.

The handheld computer used in the vehicle data system of the present invention may be any small, portable handheld capable of achieving the structural and functional advantages set forth herein. Handheld computers are dominated by two operating system markets: the Palm Pilot type units and Windows CE. Recently, the Palm Pilot type devices, including competing models such as the Visor, has the edge on market share. Windows CE offers some advantages over the Palm platform for initial versions of the device, including: existing Windows software can be easily ported to the Windows CE platform; Windows CE has very flexible hardware configurations (microprocessor, I/O, memory, etc.); many vendors provide CE based hardware, including custom configurations; and the Windows CE market share is growing. With these advantages in mind, it is clear that one embodiment for a palm-sized or handheld device will probably involve Windows CE support. However, the preferred embodiment uses a Palm Pilot type platform based on various important factors including: form factor—the standard connectors and enclosure are consistent across the Palm Pilot type platform including a 'snap-on' modem casing that can be used to house the adapter hardware; a simple O/S ideal for supporting the concept prototyping needs for feature evaluation; low end CE units are about 75% higher in price than low end Palm Pilot type units; and Windows CE devices do not share a standard RS232 connector type. The ability to integrate the system into a compact, aesthetic package along with the necessity of minimizing the product cost to the customer led the decision to utilize the Palm Pilot type platform in the preferred embodiment.

Therefore, the handheld computer of the preferred embodiment is any handheld computer having a similar platform, hardware and software, to the Palm Pilot provided by 3Com, such as the Visor. In the preferred embodiment, the base platform for the initial software is the Palm Pro (Palm 2.0 O/S). However, the system could be based on the Palm III (or higher) device if the application is expanded to utilize functions specific to those devices (e.g. Infrared communications.) Since the Palm III unit (and higher) and Palm 3.0 O/S already support infrared communications, alternative embodiments of the software of the present system may utilize this capability. In order to utilize I/R communications, a component will have to be added to the vehicle which supports IrDA communications. Physical connectivity to the vehicle could then be eliminated. Regardless of the type of handheld computer, the handheld provides a mobile user with a visual gateway to information provided on supported public datalinks (e.g. J1708/J1587 or J1939) so that he or she can view dynamic data, fault information or static vehicle information. The unit also functions as a temporary storage repository for vehicle information snapshots. This information can then be consolidated on a primary storage medium. The handheld computer includes the capability for electronic forms entry which can be utilized even with applications lacking an electronic datalink. Forms and checklists can be stored on the handheld computer and later consolidated on a PC or PC network.

Figure 3:
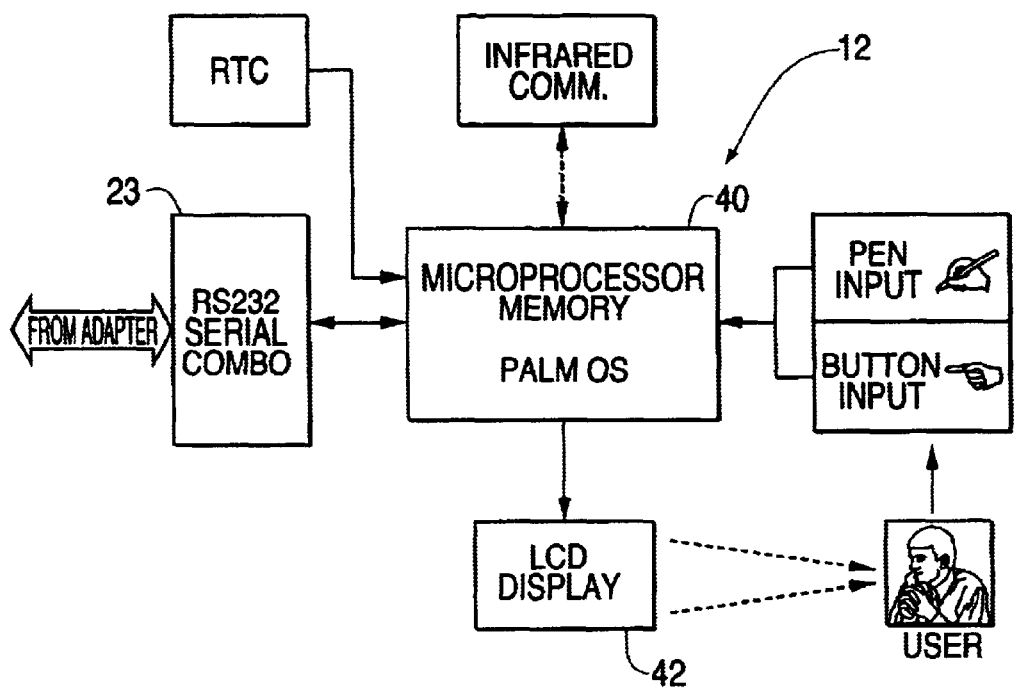
FIG. 3 is a block diagram showing the modules of the handheld computer of the system of the present invention.

As shown in FIG. 3, the handheld computer 12 includes several modules including a microprocessor 40 and memory, specifically a Motorola 68328 "DragonBall" processor. The clock runs t 16.58 MHz (the crystal is low frequency at 32.768 KHz with a 506x multiplier.) The first memory card shipped with the device has 128 K of pseudostatic RAM and 512 K of ROM for the system software and application code. A portion of the RAM (32 K) is reserved for system use and is not available for storing user data. Both the ROM and RAM are on a memory module that users can replace. User RAM varies from one handheld computer to the next; however, the system of the present invention requires a handheld computer with at least 1 Mbyte of memory, such as the Palm Pilot Pro. The Palm type handheld computer has a LCD screen 42 and a LCD controller, built into the 68328 processor, which maps a portion of system memory to the LCD. The controller can support 2 bits/pixel gray scale; however, Palm 2.0 O/S only supports 1 bit/pixel. The Palm type handheld computer also has a built-in digitizer overlaid onto the LCD screen and extending about an inch below the screen. This digitizer is capable of sampling accurately to within 0.35 mm (.0138 in) with up to 50 accurate points/second. When the handheld computer is in doze mode, an interrupt is generated when the pen is first brought down on the screen. After a pen down is detected, the system software polls the pen location periodically (every 20 ms) until the pen is again raised.

The Palm type handheld computer may have several pushbutton inputs that are utilized to launch standard Palm applications and digitized buttons that perform system functions. In addition, the Palm III devices include a programmable scroll button which can be utilized as a selector control. The Palm type handheld computer has a real-time clock and programmable timer as part of the 68328 processor. The real-time clock maintains the current time even when the system is in sleep mode (turned off). It is capable of generating an interrupt to wake the handheld computer when an alarm is set by the user. The programmable timer is used to generate the system tick count interrupts (100 times/second) while the processor is in doze or running mode. The system tick interrupts are required for periodic activity such as polling the digitizer for user input, key debouncing, etc. The timer cannot be reprogrammed by an application without adversely interfering with O/S functionality.

The Palm type handheld computer use a standard RS232 serial communications port 23 for implementing desktop PC connectivity or other external communication. The serial communication is fully interrupt-driven for receiving data. The Palm type handheld computers also include cradle 16 which is a physical device providing a convenient mechanism for the transfer of data between the Palm type handheld computer and a PC. The cradle is sold as part of the handheld computer package, and no additional engineering is required to integrate it into the system. Significantly, while the handheld connections are standard and the Modem case specifically fits the Palm Pro, Palm III, Palm IIIx, and Palm VII, the cradles are not fully compatible. Therefore, if a user has a system which utilizes both Palm Pro and Palm III devices (for instance) he or she must change the cradle in order to synchronize the data from these units to the same PC. Thus, the cradle is little more than a convenient mechanism for quickly connecting and synchronizing a handheld computer with a base PC. It includes a synchronization (sync) button for activating the handheld-to-PC synchronization process. See FIG. 7 for details on the hardware connection. The interface provided by the cradle allows for the transfer of data records stored on a handheld computer to the PC through a data 'conduit. Updates to the handheld software will be performed through a standard application installer conduit provided with the handheld computer.

Figure 4:
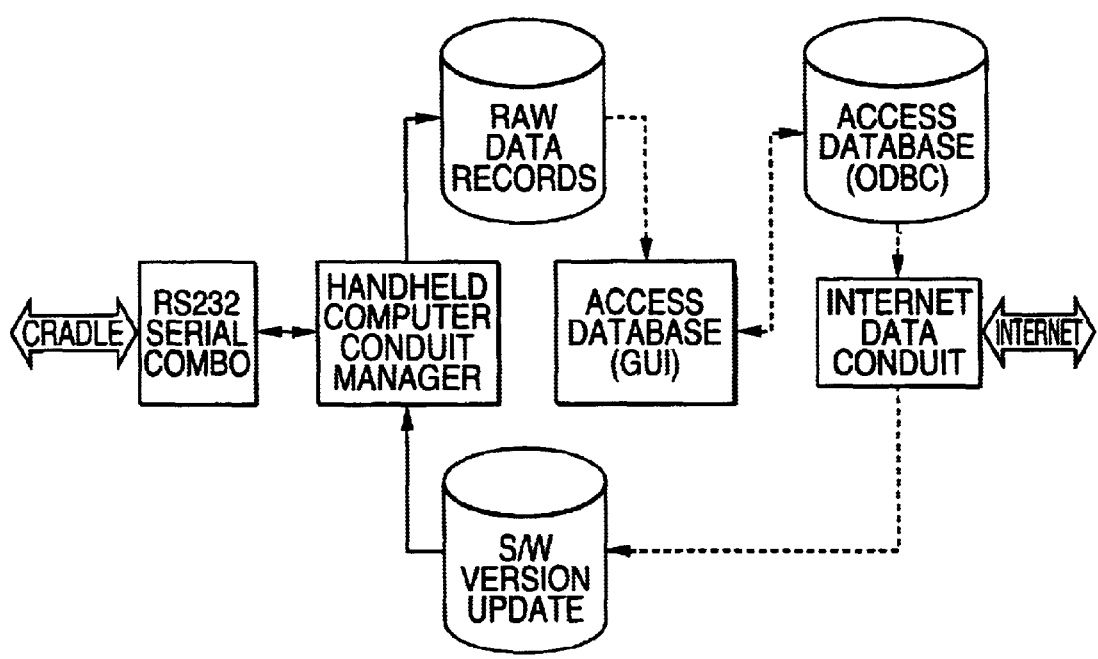
FIG. 4 is a block diagram of the PC conduit manager.

Referring to FIG. 4, data captured and recorded by a portable handheld computer 12 or computers, i.e. Palm Pilot, is consolidated on personal computer 18. Data is transferred via a synchronization process which is initiated by a button on cradle 16 which is connected to a serial communications port on the PC. The PC has resident software that establishes communication with connected handheld computers and manages the transfer of information. The established 'conduit' can be utilized for data downloads as well as software version uploads. The architecture of the PC conduit manager is expandable to support the integration of an internet-based information mover. Also, the distribution of software will take place via internet update transfers. The PC communicates with a 'cradled' handheld computer via standard RS232 serial communications. This port must be dedicated to this function while a synchronization background communications monitor is operating. When the synchronization background process is active, it is designated by an icon in the bottom right-hand corner of the Windows 95/98 or Windows NT task bar.

A handheld conduit manager is a Windows background process that monitors a designated serial port for attempts of a 'docked' or 'cradled' handheld computer to synchronize. This component manages default synchronization of calendar, address book and task list entries as well as the synchronization of custom conduits. For the system of the present invention, this includes the synchronization of data collected on the handheld computer and the integration of that data into a single consolidated database.

There are two conduits which concern the vehicle data system of the present invention: the one which transfers data from the handheld computer to the PC and the once which uploads new software versions to the handheld computer. While the first conduit is a custom conduit, capable of channeling data from multiple handheld computers into a single database, the second category will utilize the handheld software, such as Palm Install Tool, which is shipped with the handheld computer package. Once the data has been consolidated on the PC (or network), the user can analyze the data via an Access database GUI which breaks the data into several generic analysis formats. The user will be able to customize the graphical presentation of this data by making modifications to the database. In addition, he can export the data using an ODBC format so that other database applications can also be utilized in the analysis and breakdown of this data.

As shown in FIG. 5, the adapter/vehicle bus interface is a J1708 interface. Since the adapter housing utilizes an RJ11 connector (4-pin phone jack), the cable 24 that attaches the adapter to the engine J1708 datalink/bus is a standard phone cable; therefore, it does not meet J1708 conductor specifications. Information to the adapter (through the J1708 interface) must follow the J1587 protocol in order to be utilized by the present system. The adapter passes along all messages to the handheld computer with the assumption that they follow the appropriate protocols. The adapter may also be configured to support J1939 communications.

Referring to FIG. 6, the adapter 14 physically attaches (snaps) to the handheld computer through housing 20 (FIG. 1). The devices communicate over a 3-wire RS232 protocol. In the adapter, the sync switch is not attached to the general purpose (GP1) input. The initial hardware configuration sends this switch input to a PIC input channel; however, the circuit must be jumpered before this input can be utilized within the adapter firmware. The RTS line (PIN 4) is utilized to activate power on the adapter. When the RS232 port is closed, the RTS line transitions high (it is held low while the port is active when handshaking is not utilized) and the adapter is shut down.

The adapter's function is to convert J1587 packets from a J1708 protocol to an RS232 protocol. The interface between it and the handheld computer includes the following:

1. Transmission of delimited J1587 messages to the handheld computer.
2. Transmission of adapter status message to the handheld computer which informs the handheld computer of error conditions on the adapter as well as physical conditions such as battery level and firmware version number.
3. Reception of J1587 messages from the handheld computer to convert and send on the J1587 datalink.

The architecture of the present system may allow for the expansion of support for Internet connectivity for the transfer of remote data to a central database location as well as for the distribution of software upgrades from a central location to remote locations via the internet.

The vehicle data system of the present invention is composed of software components interacting on three separate hardware platforms: the datalink adapter, the handheld computer, e.g. Palm Pilot, and the PC. The system can operate in a combination of one or two of these components simultaneously. (The adapter communicates to the handheld computer using the same port as the PC, thus adapter and PC cannot both simultaneously be active.) Various configurations must be utilized to perform specific functions. The following description identifies the underlying structure of the software for the vehicle data system of the present invention including design strategies, structural frameworks, and interface strategies, thereby providing a systemic understanding of the software structure and enabling programmers to effectively make modifications to the software.

FIG. 8 illustrates the highest level software component configuration. The system consists of the three primary software components, the interfaces between them, and the interfaces to external entities. The handheld computing module 50 is software, i.e. handheld datalink software (HDL) and handheld application software, that resides on the handheld computer. As already discussed, this device is the mobile component in the system which is shuttled between a PC base and remote diesel engine vehicles or machinery. It functions primarily to capture and transport data about the status of the equipment to a central database for consolidation and analysis. It also serves as a display for technicians or field personnel which communicates the status of machinery equipped with datalink communication capabilities. It can indicate active faults, engine hours, vehicle information, and vehicle data. For vehicles without electronic communications, the device can be used to manually record critical information so that the data can be stored and tracked electronically, eliminating the need for paper forms.

Figure 9:
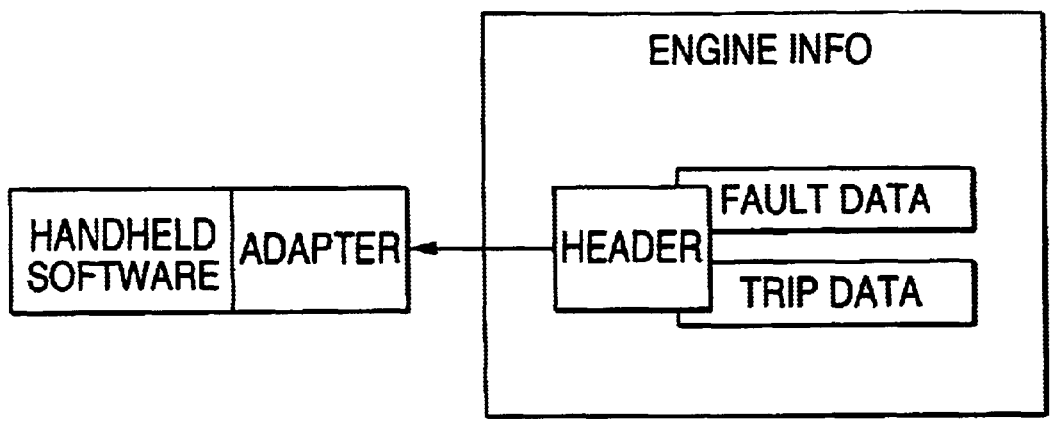
FIG. 9 is a block diagram illustrating the type and form of vehicle data input from the engine to the handheld computer via the adapter.

With respect to I/O strategies, and specifically data capture, when the handheld computer communicates with an engine via the adapter, it is capable of retrieving two distinct data sets along with a set of header information. The data sets include fault information and vehicle trip information. The header information is composed of select dataplate and related engine identification parameters. As shown in FIG. 9, machine data is related by a set of header information. An engine identification key ties this information to the vehicle and fault databases. Note that the database organization of the collected data is not a true relational database. Instead, it is a simple arrangement of data files tied together via common identification key fields in each file.

Figure 10:
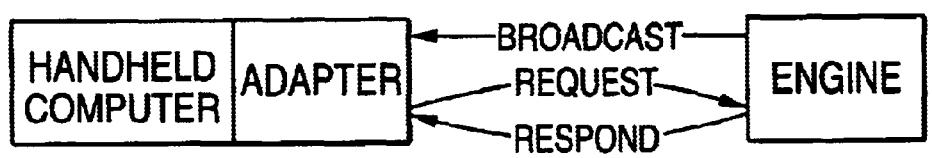
FIG. 10 is a block diagram illustrating the process for retrieving data from an engine using the vehicle data system of the present invention.

Referring to FIG. 10, the process for retrieving the data is straightforward. If the desired data is broadcast, the software need only monitor the broadcasts and then extract the appropriate information. Otherwise, the handheld software will need to issue a request for data from the engine and then await a response. Importantly, since the datalink is public, the software must be able to filter the appropriate messages from irrelevant ones. Most datalink traffic will consist of messages to be ignored.

Figure 11:
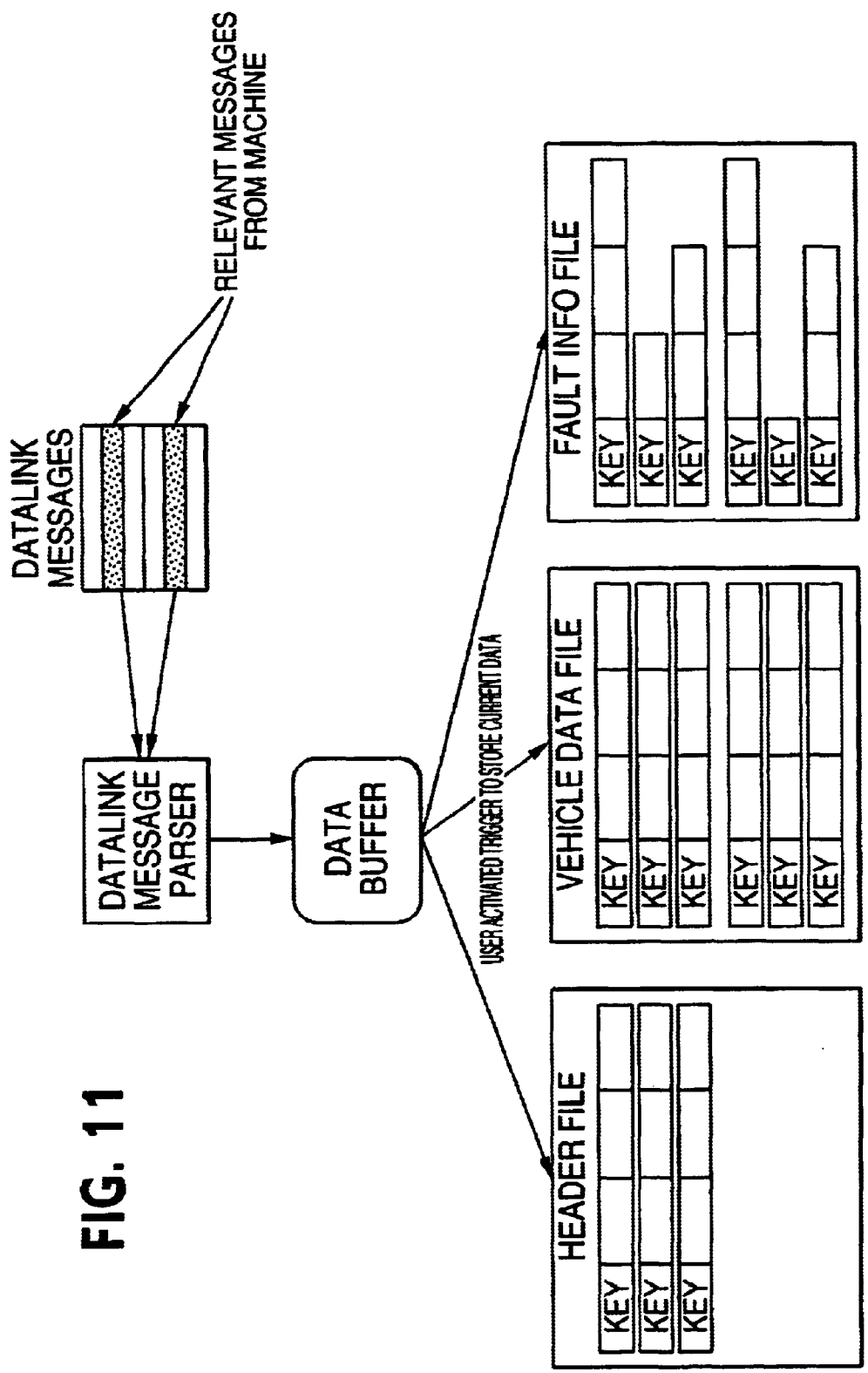
FIG. 11 is a block diagram illustrating the process of storing new data and messages on the handheld computer.

Machine data captured by the handheld computer software is stored on the handheld computer in a format that is readily transferable to a PC through the handheld conduit. When the handheld software receives relevant data messages, it first stores them in a dynamic program buffer. This buffer is updated on a real-time basis as new messages are received. A user command allows a snapshot of this information to be stored in non-volatile handheld computer RAM data files. A high level structure of this process is illustrated in FIG. 11. While the header and vehicle data have fixed record sizes, fault information records vary in size from one record to the next depending on the number of faults that have occurred on the engine from which the information was extracted. Also, as header information is typically static, numerous data and fault records are normally associated with a single header record. These header records are associated with the engine identity (i.e. there is a header record for each engine from which data is collected.) This record may change during engine recalibration; however, the critical key-field used for relational dependencies will remain the same.

Figure 12:
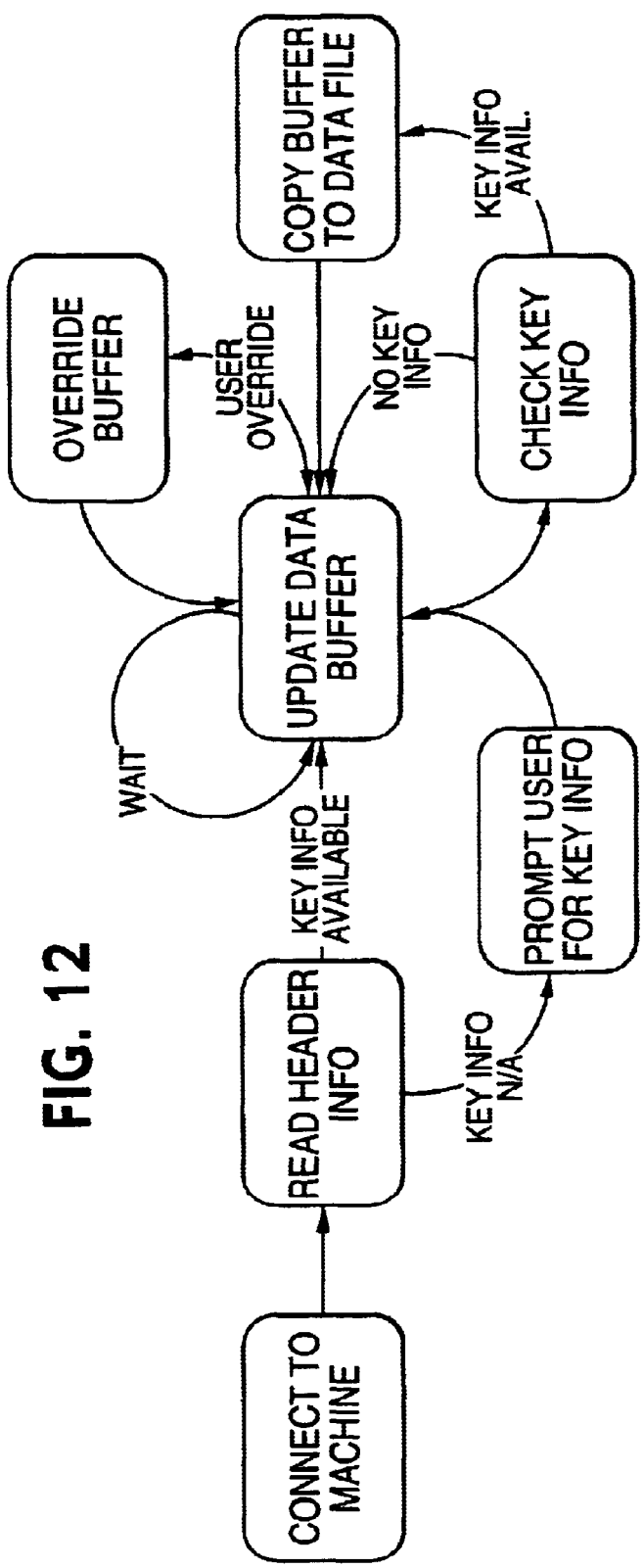
FIG. 12 is a block diagram showing the key data input/override process.

With respect to data input, the user has the ability to override header record fields that are accumulated via datalink communications. He or she can also provide information that is not provided by the communicating engine (e.g. such as with older machinery or engines that do not support certain messages.) Note that when critical identification parameters, that are utilized as data keys to relate records from separate files, are not present then the user will be required to manually enter this information in order to store the information. Untagged records cannot be appended to the data files. This process is diagrammed in FIG. 12. Key info (i.e. any information required to generate the key field for a data record) must be present in order to transfer the data buffer to the cumulative, non-volatile file which resides in the handheld computer's general purpose memory. When data is provided over the machine datalink, it is utilized as header information unless an override is initiated by the user. In such a case (such as with a corrupt or empty dataplate) the user can enter an override to be utilized for the remainder of the communication session with that machine or until the user subsequently cancels the override. This override automatically terminates when the datalink is disconnected. All data stored while the override is in effect is keyed to a header record that stores the overridden fields. If data has been stored prior to the override for that machine, it will be keyed to a different header record.

The handheld software allows the user to view real-time data by providing a display of dynamically buffered parameters. Each parameter for display is associated with a value and a state. The value, of course, is the numeric (or character) representation of the parameter that will be displayed on the handheld screen. The state corresponds to the validity of the data. There are five possible states: initial, normal, stale, unavailable and disconnect. These states are described as follows:

INITIAL—When the datalink is active but the data item has not been received and has not yet timed out. (i.e. the datalink has been active for less time than the stale limit of the data parameter and the item has not yet been received.)

NORMAL—When the data item has been received and continues to be updated at the required frequency.

STALE—When the data item has been received at least one time since the datalink activated, but has not been updated before the stale limit expired.

UNAVAILABLE—When the data item has not been received since the datalink activated and the stale limit has expired.

DISCONNECT—When the data link is inactive, all items revert to this status.

The status of each data item is indicated by the display. In addition to the display of real-time data, the handheld software allows the user to browse the data records that have been stored to the handheld computer (since the last upload to the PC.) The handheld computer allows the user to view a record at a time and to delete individual records. As this information is pulled from a data file—not a string of datalink messages—the above status indicators do not apply.

Data that has been collected from various machines is appended to the data files which reside in the handheld computer's conventional battery-backed RAM memory. Periodically, this information is typically uploaded to a PC for consolidation, analysis, and long-term storage. This consolidation frees up additional storage space on the handheld computer as data records are transferred to a larger repository.

Figure 13:
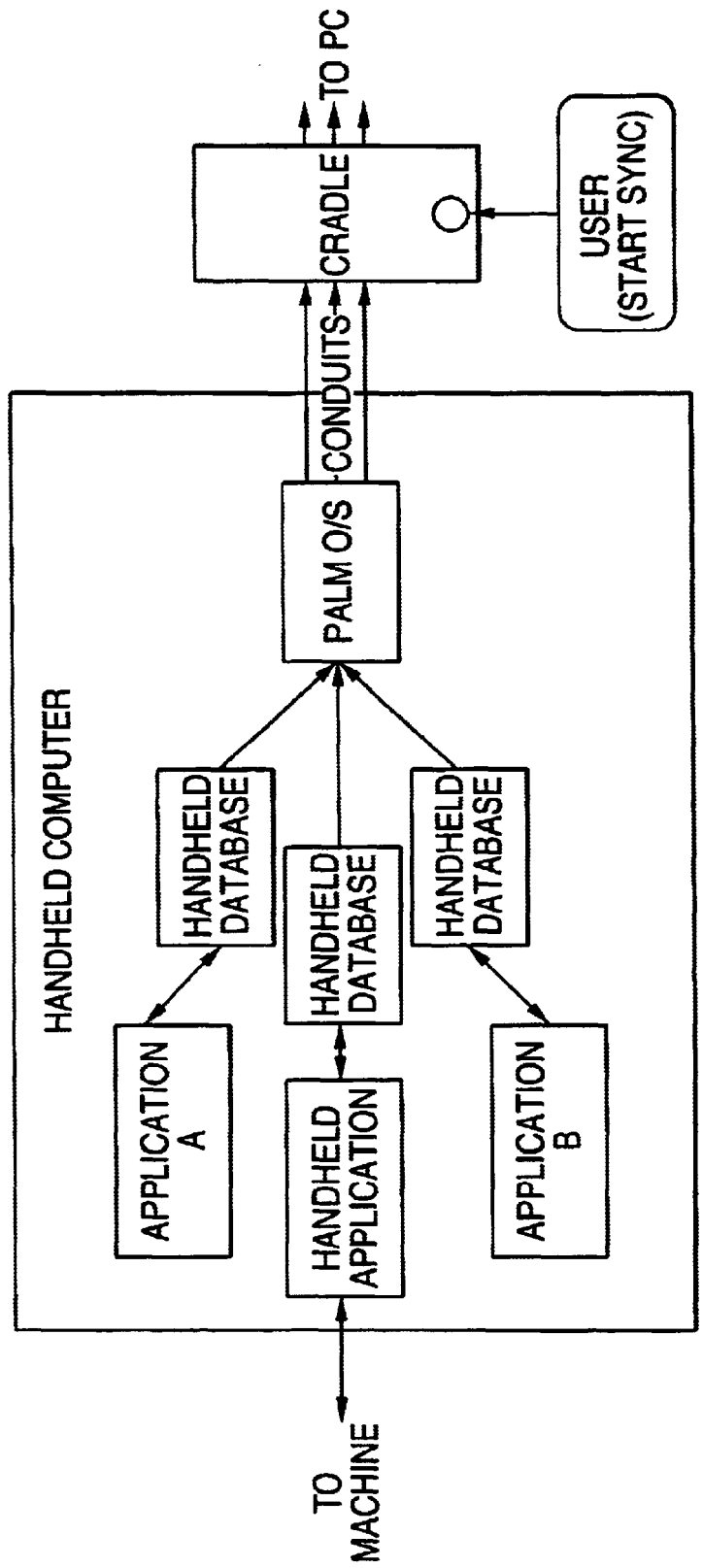
FIG. 13 is a block diagram illustrating the data upload process.

The upload process is integrated into the handheld computer process for syncing with the PC, e.g. the Palm Pilot HotSync process. A user moves data and programs between a personal computer and the handheld computer through this process. It uses a mechanism called a 'conduit' which is built into the capabilities of the Palm O/S. The proper configuration of database information provides this capability via the operating system, as shown in FIG. 13, without the application being responsible for any further functionality. The user initiates the process of data upload as he would move data from any handheld application, by depressing the sync button on the cradle. Once the data is sent to the PC, conduit control software which resides in the PC, takes over.

The handheld application memory can be broken down into the following four categories:

PROGRAM—Code space. Palm Pilot type program memory segments are limited to 64 Kbytes. Larger files must be arranged into multi-segment programs. The system of the present invention utilizes multiple program segments.

STATIC DATA—This is variable data space that is allocated at compile time; therefore, it is essentially integrated in with program memory. Many of the smaller data buffers which the system of the present invention utilizes are static data buffers.

DYNAMIC DATA—This is variable data space created and destroyed on the fly. Dynamic data can be locked and unlocked, thereby allowing the operating system the capability of managing defragmentation behind the scenes. Larger data buffers are dynamic memory buffers in the system program of the present invention.

FILE MEMORY—Databases are structured memory files that can be read, written or appended during the execution of a program, but persist beyond the termination of the application. All data that is stored for later retrieval and PC consolidation is stored in file memory.

The application of the present invention is designed to generally minimize program, static data, and dynamic memory in order to provide as much file memory as possible. The nature of memory on a Palm type handheld computer as a general purpose computing device, however, results in other programs and data having a far greater impact on memory than the isolated code and data memory of the application of the prevent invention. The reason for this is that the Palm type handheld computer user has the flexibility to load many programs and store many data records such as contacts and calendar events. The important implication of this is that, while the application of the present invention is designed relatively lean, the design does not sacrifice maintainability for file memory.

In order to accommodate file size requirements, the application monitors the remaining memory space to give the user an indication of how many more data records can be stored on the handheld computer. When the total record storage space (number of stored records plus number of records that can be stored in the remaining memory) is less than the total required record space, the application advises the user to eliminate unnecessary files and data that have been loaded onto the handheld computer.

Figure 14:
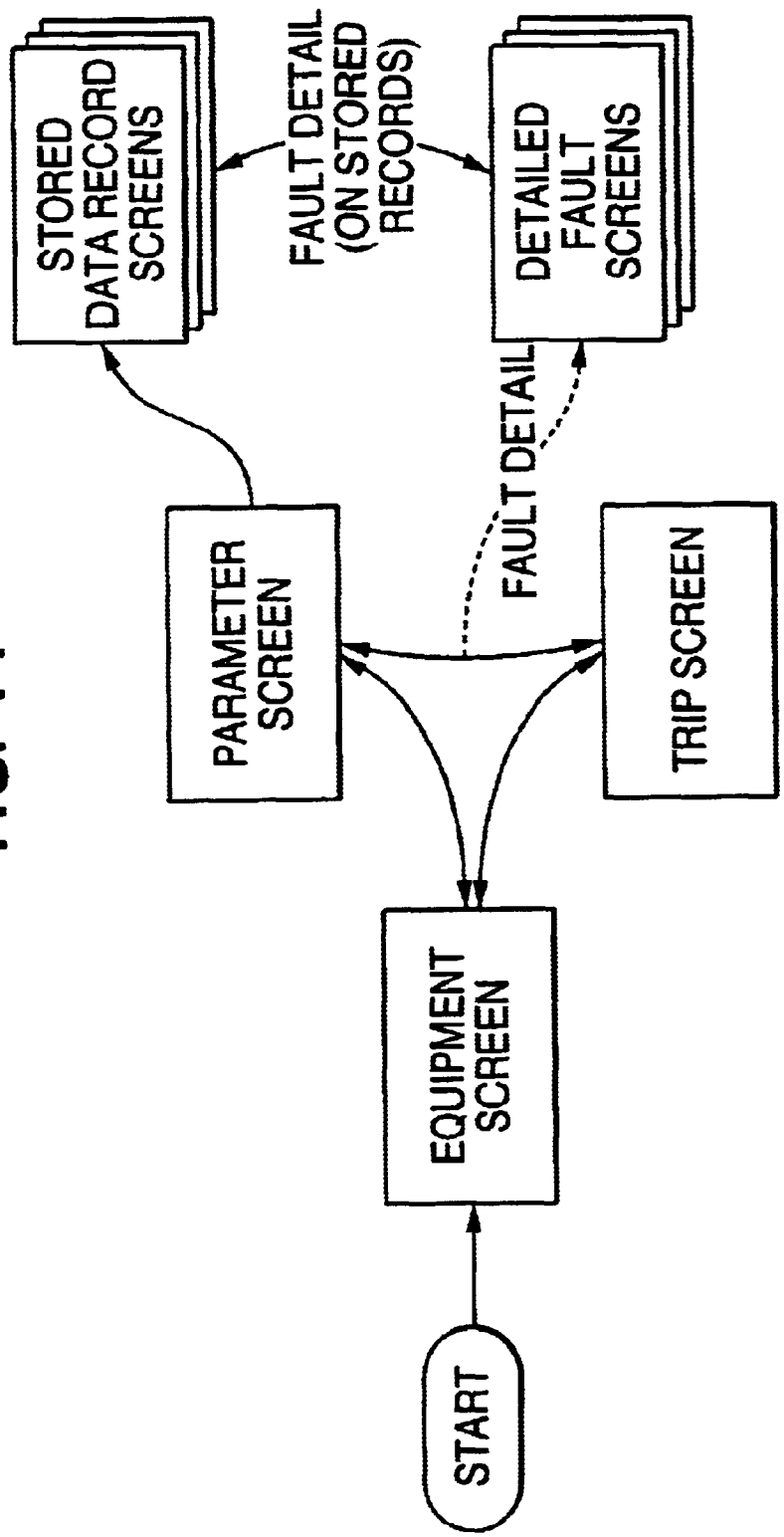
FIG. 14 is a block diagram illustrating the organization of screens presented to a user.

The user interface of the present invention is designed to be an intuitive presentation of public data link information. Users familiar with the Palm type handheld computer style interface should have no problems navigating screens and interpreting information. Primary functions are accessible to all users regardless of whether they have access to instruction manuals. The organization of the screens is shown in FIG. 14. There are three primary screens that are utilized for viewing live data: the equipment screen, the parameter screen, and the trip screen. The user can easily and intuitively move between these screens. Each of the three primary screens includes a control mechanism for triggering the storage of data. This trigger captures data in the buffer and appends it as a data file record. Both trip and fault data are stored with the same trigger.

All primary screens also utilize a section of the display to show the current set of faults. By scrolling through this table and selecting a fault, a detailed fault information screen is activated. Once in a detailed fault screen, the user can return to the previous primary screen or page through detailed fault screens for all active and inactive faults.

By using a menu command, the user can switch the application to a mode that displays stored data records. From this mode, the user can browse and delete individual records. He cannot, however, edit or modify individual record fields. Stored faults from this record can be selected and expanded in detailed fault screens identical to those that are available when viewing live data. Using a menu command, the system of the present invention can be placed into "Auto-Record" mode. This mode provides a way for users to rapidly obtain information from a series of vehicles by minimizing the steps the user must take in order to record a data record. When in the "Auto-Record" mode, a status message is displayed on the unit that tells the user the status of the auto-save activity. The possible statuses are as follows:

CONNECT DATALINK—The data link is currently inactive and the device is awaiting connection.

CONNECTING—The present system has detected an active data link, but has not received all necessary data to store to a file.

STORING DATA—All necessary data has been received and the application is writing it to a file. Though it is technically acceptable to disconnect the data link during this state, the user will not be directed to do so until it is over.

DEVICE READ ERROR—The device has detected data link activity but cannot acquire the needed data (this is a time out of the 'CONNECTING' state.)

DEVICE WRITE ERROR—The device could not save the record to memory. This error will occur when the handheld device is low on available memory.

OKAY TO DISCONNECT—The information for that machine has been successfully saved and the user is free to disconnect the data link.

Figure 15:
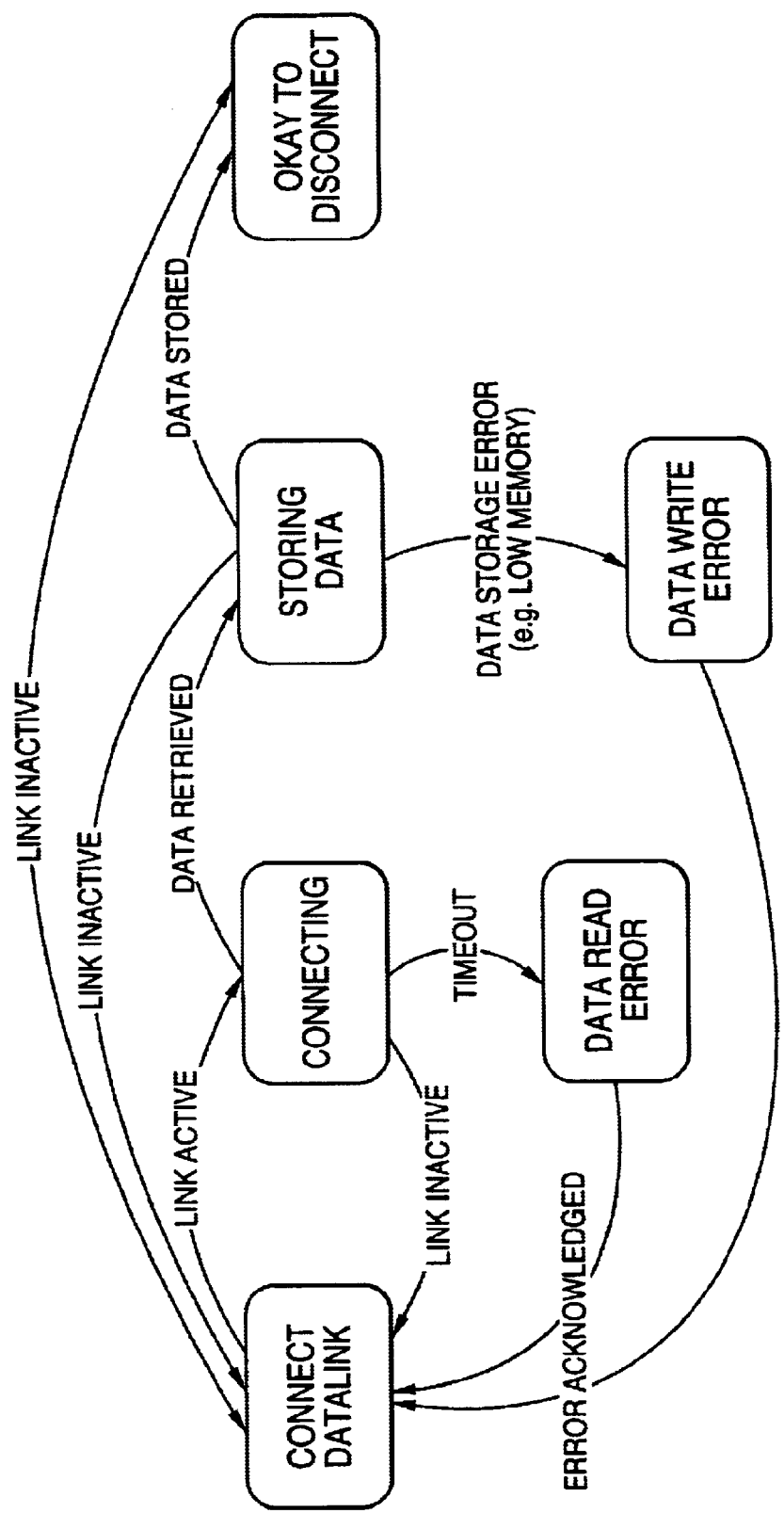
FIG. 15 is a block diagram illustrating the auto-record/auto-save mode of the system of the present invention.

All error conditions will be displayed to the user for acknowledgement. When a 'WRITE ERROR' occurs, the application suggests deleting any unneeded applications from handheld computer memory. When memory is nearly full, the CONNECT DATALINK status message will be accompanied by a "Low Memory Warning." The auto-save state machine is diagrammed in FIG. 15.

The adapter is the component of the system that allows the handheld computer, which is equipped with RS-232 communications, to interface with diesel electronics which utilizes different hardware communications (such as J1708 or J1939). The primary function of the adapter is to convert incoming machine messages to an RS-232 protocol and send the messages to the handheld computer, and to convert incoming RS-232 messages to a protocol supported by the diesel electronics. The adapter supports J1708 communications. Conversion from J1708 to RS-232 can be achieved by utilizing a simple straight-through approach; however, this requires that the RS-232 device be capable of monitoring incoming bit times in order to detect line idle and message termination times. As previously discussed, communications routines on handheld computers such as the Palm Pilot are provided by the handheld operating system, i.e. Palm O/S, and do not provide access to the raw communications interrupts. The other alternative is to use a sophisticated parsing mechanism in order to determine message termination via analysis of the message contents. Both approaches would add an undesirable level of complexity to the application software as discussed hereinabove.

Figure 16:
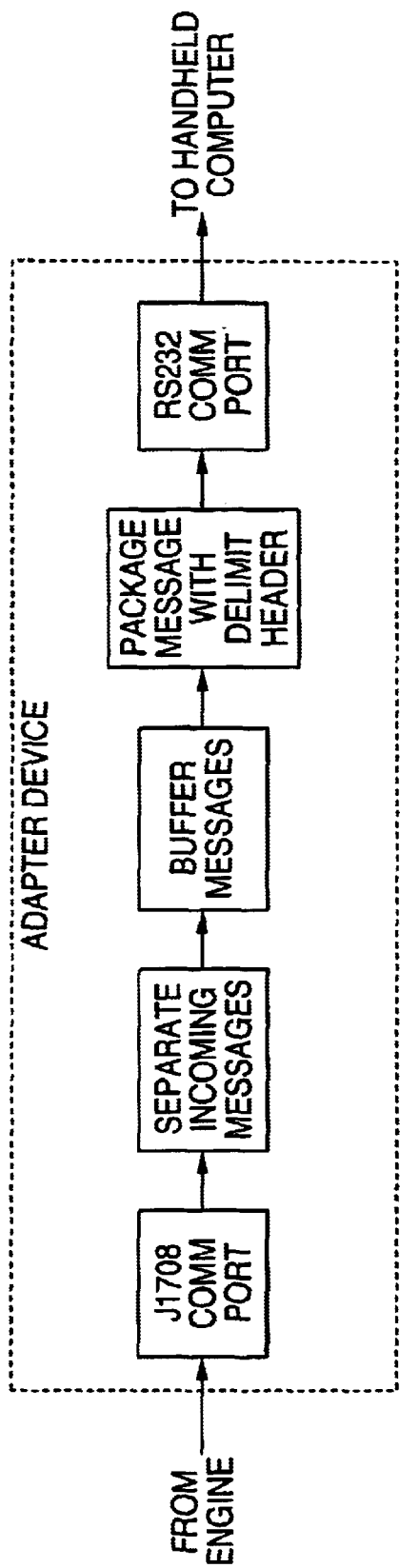
FIG. 16 is a block diagram illustrating the process for converting messages received from the engine using the adapter software for delivery to the handheld computer.
Figure 17:
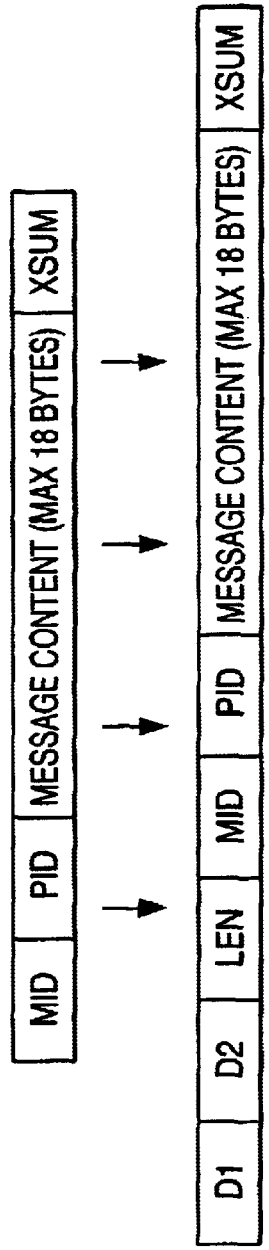
FIG. 17 is a block diagram illustrating in greater detail the processing of a message received from the engine.

The selected alternative approach was optimal from the perspective of the software architecture of the handheld application. Referring to FIG. 16, this approach utilizes the PIC microprocessor in the adapter hardware which buffers individual J1708 message packets, inserts a delimiting header and stuffs it out the RS232 port. The adapter software monitors the bytes that are received on the J1708 data link. When it detects message termination, which is an idle state that exceeds two bit times, it buffers the message, inserts a delimiting header, and sends out the new message on the RS232 data link. The adapter carries out no processing of the message itself, including checksum verification. The delimiting header is a simple mechanism that consists of a two character delimiter and a message length character. As shown in FIG. 17, with the inclusion of the length byte, once the messages are originally synchronized (i.e. once the application parser has correctly detected the D1, D2 sequence) subsequent messages will remain in sync with the parser unless the adapter buffers overrun. The delimiter characters include an unused J1587 MID in order to reduce the possibility for long message synchronization times.

Figure 18:
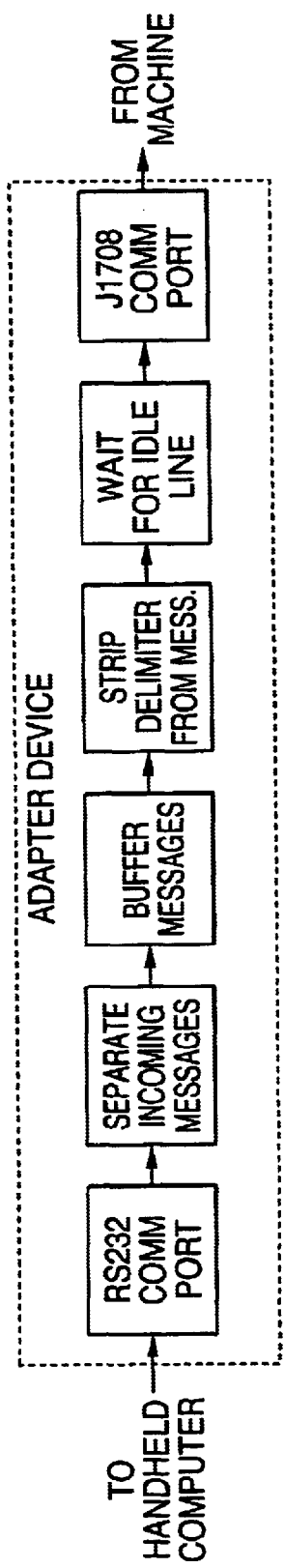
FIG. 18 is a block diagram illustrating the processing of a message received from the handheld computer by the adapter for delivery to the engine.
Figure 19:
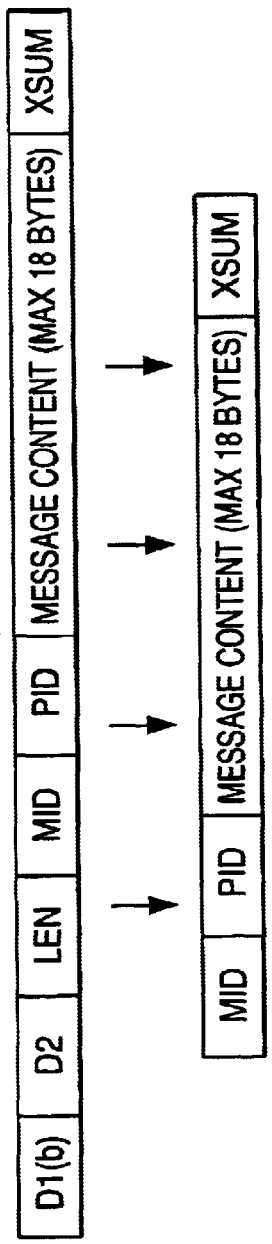
FIG. 19 is a block diagram illustrating the header stripping of the message to be transmitted to the J1708 port.

Referring to FIG. 18, for communication translation from RS232 to J1708, the adapter utilizes a process that mimics data flowing in the opposition direction as described hereinabove. This time, the handheld application constructs outgoing J1587 formatted messages wrapped in the delimited header and ships them out the RS232 communications port. The adapter software reads and buffers the incoming messages, strips off the header and then transmits the messages on the J1708 datalink. Note that in this direction a different D1 delimiting character is utilized. This is not technically necessary since RS232 is fill duplex; however, it makes implementation less confusing and provides an additional convenience during testing and debug. The primary difference in packet swapping in this direction is the added wait state before final transmission. Since J1708 is half-duplex, the communications link must be idle for long enough in order for the adapter to obtain control of the communication link. The priority used by the system of the present invention for J1708 communications is '8'. The header stripping of the message to be transmitted on the J1708 port is shown in FIG. 19.

Figure 20:
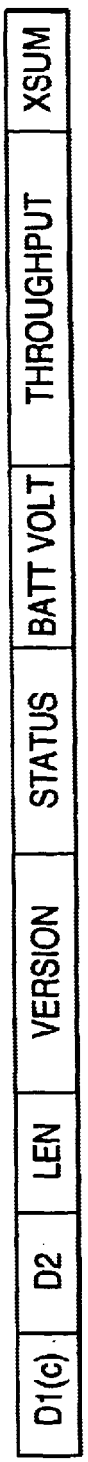
FIG. 20 illustrates the formatting of an adapter status message.

On a periodic basis, the adapter software issues a status message on the RS232 communications link in order to update the handheld application of its status. This message contains information on the adapter firmware version, battery level, throughput, and error status. The cycle of the status message is nominally based on a counter on the adapter. The counter counts up with every instruction cycle, and when it rolls over it triggers the transmission of the status message. The rate is, therefore, dependent upon the clock speed of the PIC microprocessor. (At 4.9152 MHz the counter rolls over approximately every 3.4 seconds. The message is formatted as shown in FIG. 20. Throughput is a relative measurement which provides an indication of how well the adapter is handling the current data link utilization level. The provided measurement is a count of the number of times the background loop executes during the 3.4 second rollover. Since all communication processing occurs during interrupts, this count decreases with increased data link utilization. Importantly, this cannot provide an absolute measurement.

The adapter module memory is constrained by the resources of the PIC17C756 microcontroller. It contains 16 Kbytes of OTPROM and 902 bytes of RAM memory. Most of the RAM is utilized for the buffering of datalink messages. If the program space is less that 8 Kbytes, it is possible to arrange the OTPROM such that it can be programmed more than one time. Basically, this is accomplished by dividing the OTPROM into multiple one-time programmable blocks. This capacity has not been utilized in the software architecture of the adapter module.

The adapter module is utilized by snapping it on to the base of the handheld computer and attaching the appropriate datalink to the RJ-11 adapter cable. The battery level is tracked by the system application of the present invention which will advise the user when new batteries are needed. There is a pushbutton on the front of the adapter that is not currently utilized. Future versions of the adapter can be configured to utilize this pushbutton.

The PC module provides the mechanism for moving data collected on the handheld computer to a personal computer. This serves three primary purposes: to provide memory for additional records on the handheld computer, to consolidate data from multiple handheld computers, and to allow the data to be analyzed by applications external to the system (i.e. databases, spreadsheets, etc.) The PC module also serves as the mechanism for moving program updates onto the handheld computer. Application files that are obtained over the internet, by email, or on disk can be loaded into the handheld computer's memory.

Programs and files are moved to and from the handheld computer through standard interface pathways called 'conduits.' Packaging these items as conduits allows the system to utilize a great deal of functionality that already exists through the handheld support package. It also allows the transfer of this information (called synchronization) to be integrated with the transfer of data from other applications residing on the handheld computer (e.g. calendar, address book, task list, etc.) The data conduit is responsible for transferring the data files of data plate, trip and fault information from one or more handheld computers into consolidated PC data files. The data files are 'flat' files (comma-delimited text files) that can be imported into databases and spreadsheets external to the application of the present invention for further analysis.

Figure 21:
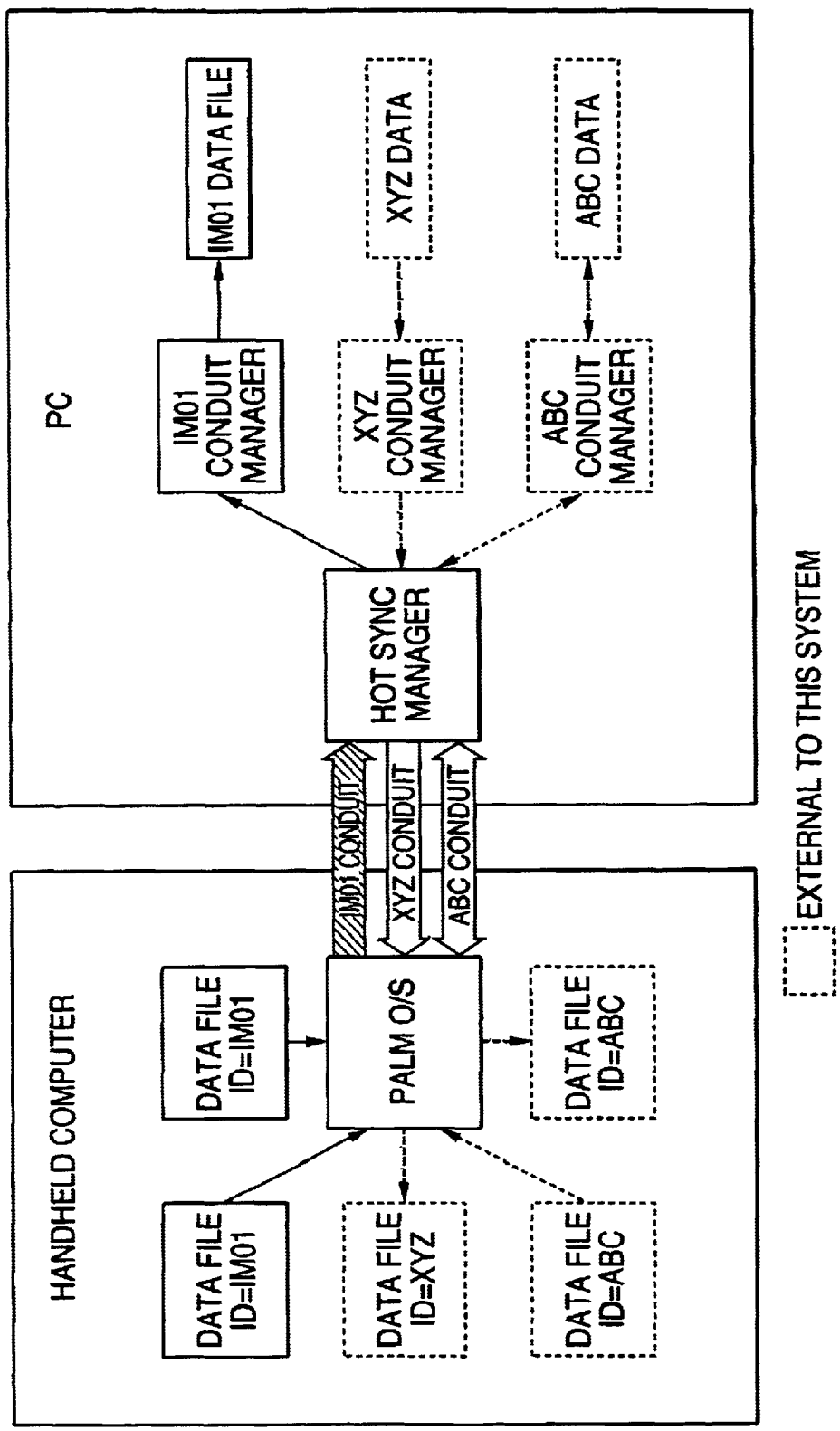
FIG. 21 is a block diagram illustrating the process of transferring files from the handheld computer to a PC via the data conduit.

The hub of conduit management is the synchronization manager software, e.g. Palm HotSync Manager. This is a background application that runs on Windows and monitors a specified serial communications port for handheld computer activity. That is, when a user attaches the handheld computer and then initiates synchronization by depressing the sync button on the handheld cradle, then the sync manager seizes control of the process, initiates, and manages all conduits on a priority basis as shown FIG. 21. As shown, conduits can be unidirectional or bidirectional. The data conduit of the present system is unidirectional. It transfers three separate files (which share the same IM01 identifier) to from the handheld to the PC: the header (or vehicle identification) record file, the trip record file, and the fault record file. Both the trip and the fault files are deleted from the handheld computer during this process. The header records are left untouched because the system application of the present invention must utilize that information to automatically identify these same vehicles during a fixture connection.

The sync manager initiates the conduits by priority. When the system data conduit of the present invention runs, the sync manager channels processing control to a custom DLL which then pipes the incoming data into the appropriate data file. For this application, the data is stored in a user-global file. That is, regardless of the user carrying out the synchronization process, the data is appended to the same files.

The system application of the present invention can easily be transported to the handheld computer from the PC. The application files can be distributed on any digital medium that the particular PC supports: disk, internet, email, etc. The user can then run an appropriate application install program, i.e. the Palm Install Tool, which is an application that is distributed with 3Com's Palm computers. Using this tool, the user specifies the files to install, and the next synchronization activity installs the application over the general installation conduit. The program files consist of the application (PRC file) and two data files which contain information about display text.

Once the user has installed all software, she will only be required to activate the sync process by depressing the button on the cradle. This initiates the sync process which automatically begins processing conduit transfers. If the user needs to reload or update the system application of the present invention, he or she will be required to initiate an install utility prior to the synchronization event in order to queue the transfer of the appropriate program files. Synchronization activity is designed to avoid user intervention. It automatically transfers files and data in the appropriate direction (including the deletion of records following the transfer, where applicable.) The user is informed of progress of the synchronization process through the sync manager window.

The handheld software is the code residing on the handheld computer. It exists to provide the user a window into the public information available from machine electronics as well as to serve as a temporary storage medium for this data. The software has three primary functions: collect public data from the data link, display data on the screen, and store data in memory. With respect to a Palm handheld computer, since Palm code segments are limited to 64 Kbytes in size, it is necessary to arrange the program into segments.

Figure 22:
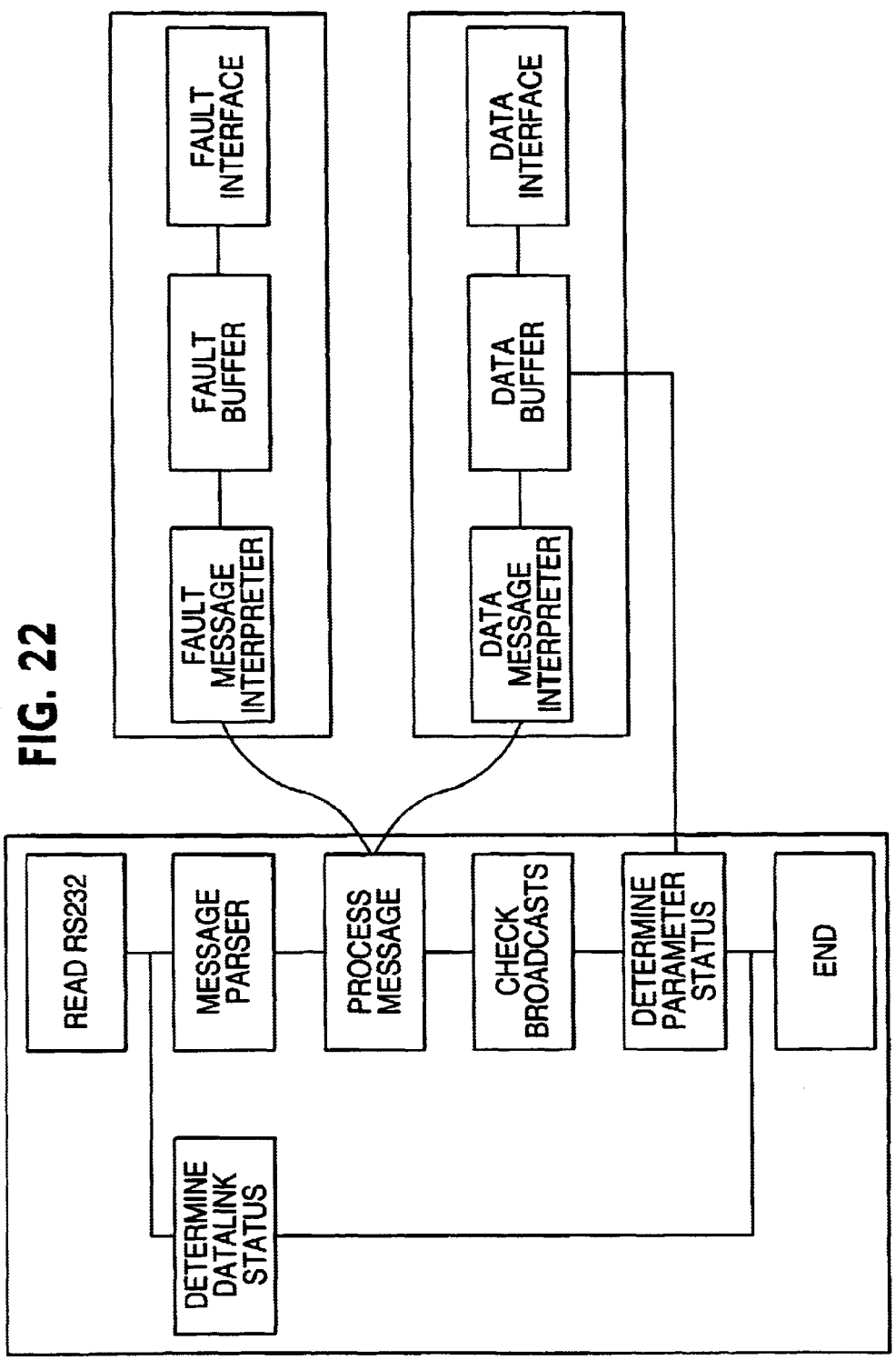
FIG. 22 is a block diagram illustrating the modular structure of the serial data manager software.

The handheld application software is divided into two high-level modules: the SDM (Serial Data Manager) software and the Application software. The SDM consists of all the software necessary to parse and process messages that are received over the datalink/bus. The Application consists of the graphical presentation of information and regulation of user navigation along with the storage of data records. The SDM manages requests for machine parameter information and the collection of datalink messages. It buffers the incoming data and provides an interface to the application for that data. The modular structure of the SDM is diagrammed in FIG. 22. The handheld SDM is organized into three files. The data interfaces for fault information and data information are defined within the respective public header files.

Figure 23:
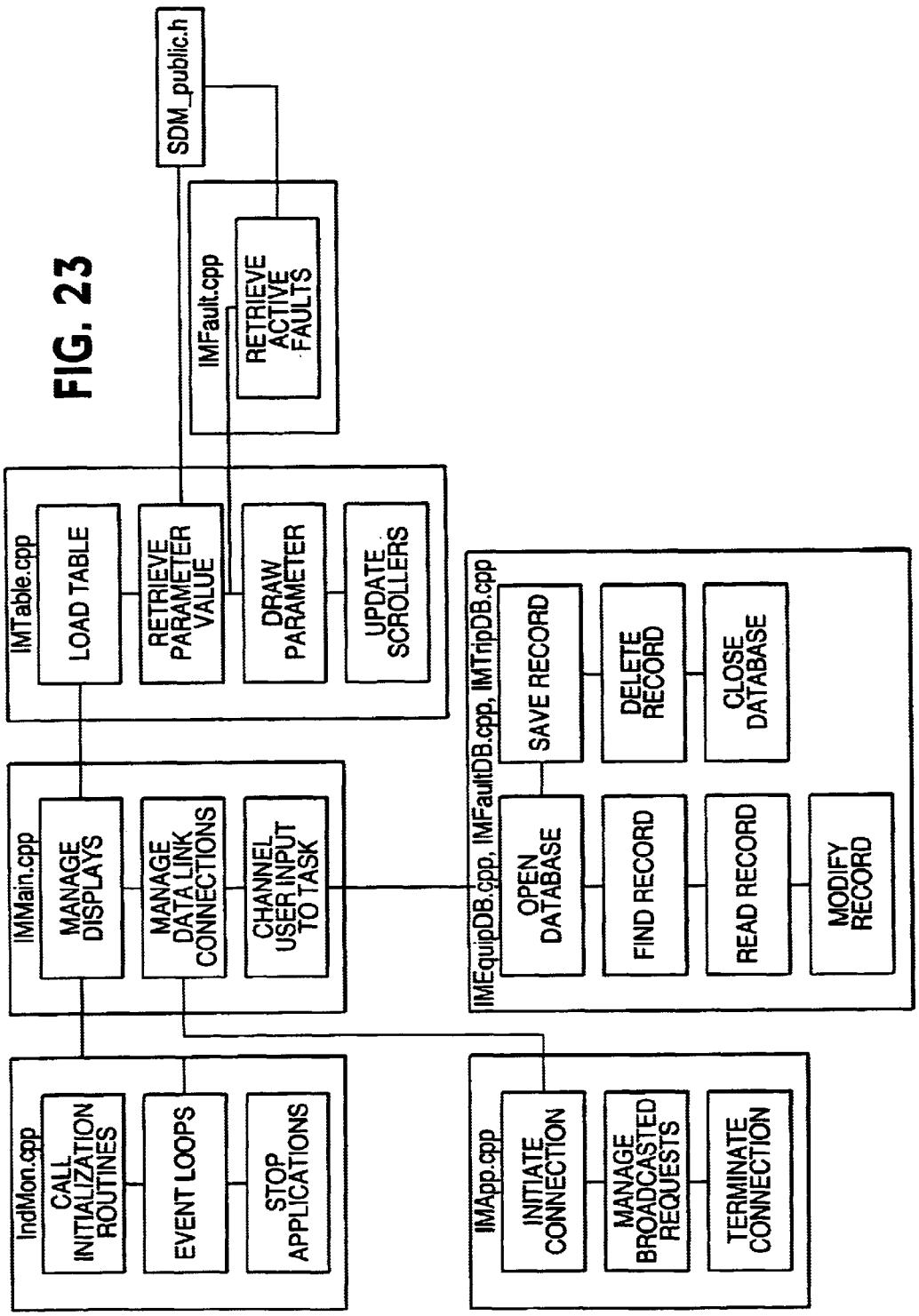
FIG. 23 is a block diagram showing the modular structure of the application software component of the handheld application software.

The application software is arranged into object modules. The base module (INDMon.cpp) contains the event handling loop; however, the primary distribution of tasks occurs from within IMMain.cpp. This module channels update tasks, data link tasks, and user input tasks to the appropriate service routines. The modular structure of the application software is diagrammed in FIG. 23.

The adapter software is essentially a packet-switching utility. It packages J1587 messages so that the handheld data link software (HDL) can read them by adding a delimiting header, and it formats messages from the HDL by eliminating header information and transferring the core J1587 message onto the J1708 data link during the next available transmit slot. It also tracks its own operational status (such as communication overflow errors, throughput saturation and low supply voltage) and communicates it to the HDL. Most of the functionality in the adapter occurs within the interrupt service routine, which manages all inbound and outbound communications traffic. Very little occurs in the main loop. The interrupt service routine services five different types of interrupts: transmit on RS232, receive on RS232, transmit on J1708, receive on J1708 and timer interrupts. Most initialization involves configuring the PIC microcontroller to support the adapter application. There is common distributed initialization logic in the software, but the calls are all made from the main module (main.c) prior to the execution of the background loop. The main program loop cycles indefinitely while waiting for communication interrupts to service. This loop contains a minimal amount of program functionality. The main loop is diagrammed in FIG. 24.

FIG. 25 diagrams the communications module. All interrupts are handled by the same service routine. Flags are set to indicate which situation triggered the interrupt (ready to transmit byte or byte received on either communications port.) The routines buffer incoming messages, send queued messages, and manage the communications process. The RS232 port is full-duplex thus can support simultaneous bi-directional data; however, the J1708 port is half-duplex and also includes idle line detection logic and collision detection logic to insure communication integrity. The adapter communications logic is diagrammed above.

The timer module manages all the timers for J1708 communications. Timers are required to determine idle time on the line as well as to calculate the end of message delay following a string of data. The timer module code is located in timer.c and is utilized from within the interrupt handler.

Figure 26:
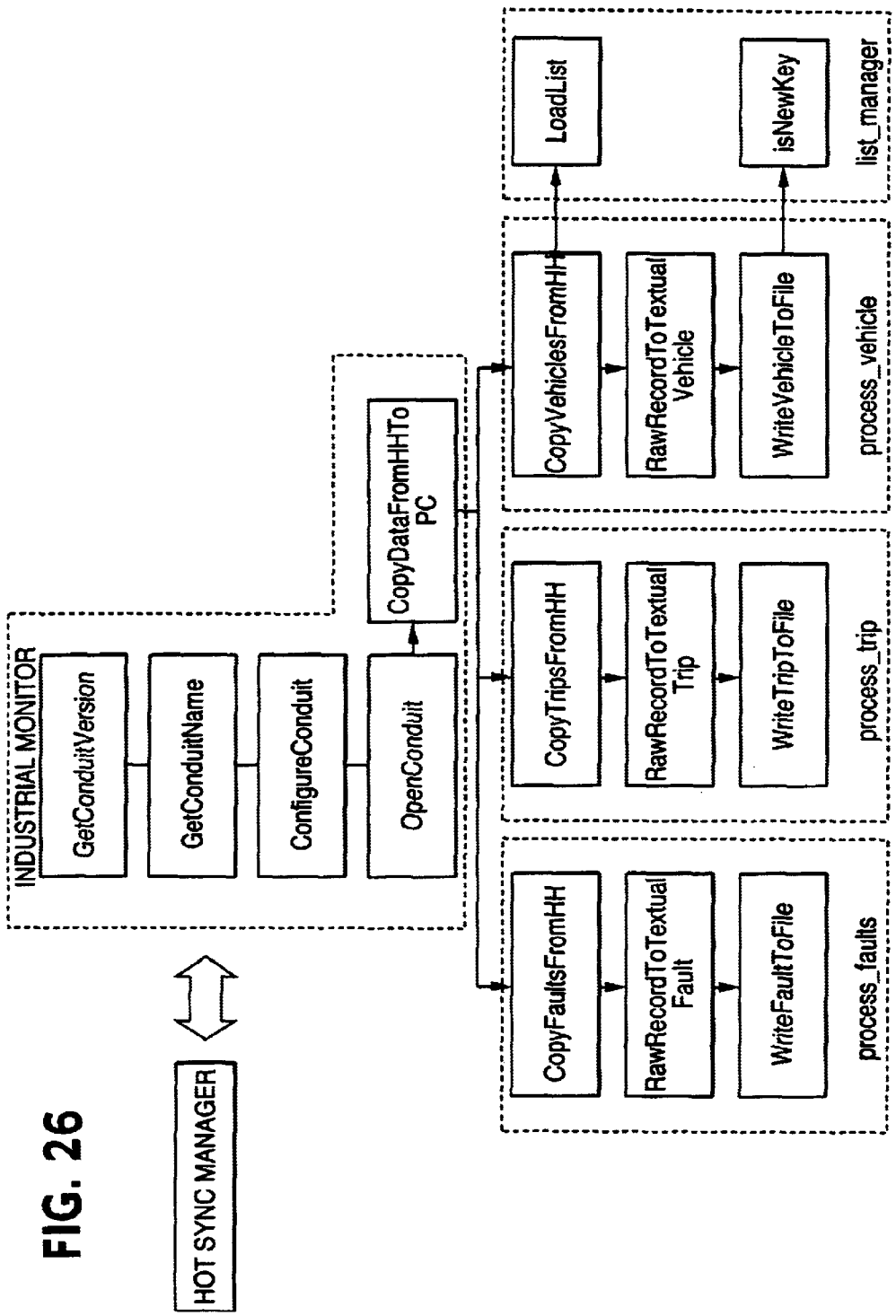
FIG. 26 is a block diagram illustrating the conduit software organization.

Referring to FIG. 26, with respect to PC conduit software organization, the conduit software piggy-backs off of the existing handheld synchronization utility. When the conduit is installed, it registers itself with, in the case of a Palm, the Hot Sync application. Then, on subsequent synchronization, the Hot Sync manager utilizes custom software to move data to or from the handheld computer. The conduit software is responsible for acquiring fault, trip and vehicle identification information and moving it to a comma delimited flat file on the PC. From there, other PC applications are free to import and process the data. The conduit code is broken into modules which correspond to the imported data type. A main "Industrial Monitor" module handles the standard conduit processing and then invokes other modules to process the data that is piped across the conduit.

Handheld software, such as Palm Pilot software, utilizes data files to hold configuration information and text strings. This is advantageous for several reasons. By storing configuration information in a data file, users can alter the functional capability of the application without affecting the code. For instance, if a user wants to add PID support on the device, a utility to append to the data file which defines the PIDs can be provided to edit the appropriate data file. This way, support for new PIDs can be added without altering the code or recompiling. By storing display text in data files, foreign language support can be seamlessly added merely by replacing (or switching) data files.

In order to provide flexibility to the application user, parameter configuration may be provided via application configuration software to permit a user to process only specific datalink message as defined in a customized database. The system would reference the database that may be altered to support a modified set of parameters based on the user's preferences/vehicle application. As a result, the system can be tailored to monitor and track PIDS and faults and display information tailored to a specific vehicle application.

The input PID configuration records are located in a data file; it stores information about the PIDs that are to be processed by the HDL module for a particular MID. Additional MIDs will utilize additional data files. The fields of the Input PID Configuration record are shown in the following table:

| ITEM | TYPE | Description |
| --- | --- | --- |
| ParamID | UINT | The index into the table |
| PID | UCHAR | The PID (Parameter ID) associated with this record |
| Scale | Double | The J1587 Scaler |
| Offset | Double | The J1587 Offset Value |
| StaleTime | ULONG | Data has "timed out" if not received in this time period |
| RequestTime | ULONG | The frequency that this parameter must be requested (If zero, then no request is required.) |

The parameter display configuration records contain formatting information about how the related parameter is to be presented to the user. The fields of the display configuration records are shown in the following table.

| ITEM | TYPE | Description |
| --- | --- | --- |
| PIDorSID | UINT | The link to the datalink item |
| PIDorSIDswitch | UINT | Indicates whether the display item is a PID or a SID (subsystem ID) |
| DecriptionCode | UINT | The link to the text description for the display item |
| Unit | UINT | The parameter units to be displayed |
| Precision | UINT | The number of decimal places to display |
| ScreenType | UINT | Identifies screens (parameter, trip, info) on which the parameter will be displayed |
| Order | UINT | The order to display |
| Display | UINT | Identifies whether the parameter is currently to be displayed on its ScreenType, i.e. a parameter can be turned off |

The text display records hold the actual strings that appear on the handheld computer display window. These files can be interchanged in order to support foreign language translations. The text display records are formatted as shown in the following table.

| ITEM | TYPE | Description |
| --- | --- | --- |
| DescriptionType | UINT | Identifies the category this description belongs to. |
| DescriptionCode | UINT | The link to display the item |
| DescriptionSubCode | UINT | Also links to the display item for organizing the various descriptions under category types |
| ShortDescription | CHAR[20] | The brief display description |
| LongDescription | CHAR[80] | The detailed display description |

This data is collected by the user as he attaches to various vehicles. The initial time a particular handheld computer is connected to a particular machine, the user is prompted to enter a unit identification tag for that machine. Once that has been done, the application of the present invention then automatically relates the Engine Serial number to that identification tag on subsequent connects. The information for that relationship is stored in the vehicle definition (header) records. All data records are linked to a vehicle definition record to indicate the source of the data. The vehicle definition record fields are shown in the following table.

| ITEM | TYPE | Description |
| --- | --- | --- |
| VehicleID | ULONG | Uniquely identifies a vehicle identification record |
| VIN | CHAR[20] | Vehicle Identification Number |
| ComponentID | CHAR[20] | The serial number of the ECM |
| SoftwareID | CHAR[20] | Identifies the version of the software in the ECM |
| UnitID | CHAR[20] | User entered machine identification number |

When a user captures data while connected to a machine data link, information about all faults for that machine are recorded in fault records. The fields of the fault records are described in the following table.

| ITEM | TYPE | Description |
| --- | --- | --- |
| VehicleID | ULONG | Links to the appropriate vehicle definition record |
| TimeStamp | ULONG | Timestamp of the download (not fault occurrence) |
| TotalEngineHours | ULONG | Engine hours at time of fault download |
| FaultCode | UINT | Cummins Fault code sssociated with this fault |
| FaultFlags | UINT | Flags for PID/SID, Fault Active, & Cummins Code Available |
| FaultID | UCHAR | PID or SID (determined by the flags) |
| FaultMID | UCHAR | The MID of the fault reporting device |
| FMI | UCHAR | Failure Mode Indicator |
| FaultCount | UCHAR | Fault occurrence counter |
| FaultTextLen | UINT | Length of the fault description |
| FaultText | STRING | Variable Length Description of the fault condition |

When a user captures data while connected to a machine data link, information about vehicle totals (trip data) are recorded in trip records. The fields of the trip records are described in the following table.

| ITEM | TYPE | Description |
| --- | --- | --- |
| VehicleID | ULONG | Links to the appropriate vehicle definition record |
| TimeStamp | ULONG | Timestamp of the download (not fault occurrence) |
| ValidFlag | ULONG | Validity bits. A validity bit exists for each of the following data items. If the validity bit is set, then the data is valid for that parameter. |
| TripData1 | DOUBLE | First Piece of Trip Data |
| TripData2 | DOUBLE | Second Piece of Trip Data |
| TripData3 | DOUBLE | Third Piece of Trip Data |
| ... | ... | ... |
| TripDataN | DOUBLE | $N^{th}$ piece of Trip Data |

Since it is impossible to plan for or predict all the capabilities which users will eventually desire or expect from the system, it must be organized in such a way that provides a reasonable amount of flexibility. Software malleability has its limits, and design flexibility has various complexity tradeoffs and resource overhead associated with it. However, parts of the software architecture which are structured to provide flexibility in the future expansion of system capabilities. For example, it is expected that later versions of the application of the present invention will support additional data link protocols. This support can be integrated into the current architecture by assigning the new protocol a unique delimiting header sequence. Several steps must be carried out to implement this change. After the necessary hardware changes have been made to the adapter, the firmware that resides on the PIC processor must be modified to attach an identifying delimiter on messages of that protocol. If the protocol communicates at a high rate, the software must also be changed to provide adequate buffering characteristics.

Note that the preferred embodiment configuration of the hardware utilizes the RTS line to switch power on the adapter. Palm Pilot documentation indicates that for communication rates above 19200, handshaking must be utilized. If the expanded protocol rate combined with the PIC processor buffering capabilities requires the adapter to communicate with a handheld computer, such as a Palm device at a rate higher than 19200, then more invasive modifications will need to be developed. The software changes for the adapter are straightforward. First, it must support the new protocol and buffer incoming messages on that datalink. Then, it inserts a delimiting header which identifies the protocol. This allows simultaneous support of multiple datalink types.

The handheld application needs to be capable of translating messages from the new protocol. This additional functionality is straightforward to add into the current parsing structure. Basically, the message can be identified by the delimiting header. This will determine which parser to utilize. The new parser can be seamlessly inserted to provide processing of the new protocol. Of course, the new logic needs to be developed; however, the existing architecture is not disrupted by this change.

In order to allow the application to vary its display according to the data links that are active, it will also be required to modify the parameter configuration record structure to include additional necessary information for protocol identification. Ordinarily, only a single data link should be active at a time. Nothing in the structure of the SDM prohibits simultaneous processing of multiple data link messages arriving at the RS232 port; however, in order to prevent undesirable fluctuation in parameter values for those parameters which are broadcast over different data links, a priority mechanism must be incorporated.

In order to streamline the serial data link processing logic, the SDM includes a MID filter which ignores all non-specified MIDs. This filter list must be updated to support additional MIDs (e.g. transmission). Once the filter list is updated, the parameter configuration database can be modified to provide for that MID. Protocols that do not support "MIDs" (or a reasonable equivalent) can be configured within their respective parsing algorithms to ignore this property altogether.

Support for various messages with a particular data link protocol is provided through the support of PIDs (Parameter ID). Additional parameter support can be implemented by appending the parameter configuration file with a record of the information required to process the PID and adding a corresponding text display record. If the data link protocol and MID are already supported, then no additional code modifications are required to add support for additional parameters.

The importance of the capability of foreign language support was a primary concern in the development of this architecture. As a result, all text display strings managed by the application are located in databases that can be swapped to support alternate languages.

The software may also provide additional data to the various data file records that the system utilizes. In order to prevent old data from being rendered useless, a conversion utility will be provided with software upgrades (when data file formats change) that will be capable of converting existing data files to a compatible format. New data fields will be tagged as invalid on the older data records.

Occasionally, faults are added to the list of fault codes. When the list of new faults becomes large enough to warrant an update, a new version of the present application may be released which supports these codes. Rapid response to newly defined fault codes was deemed unnecessary since the application will remain capable of displaying the PID/SID and FMI (failure mode indication) of the failure condition and only the reference to the new internal number would be unavailable.

Errors that are detected through calls to the handheld operating system are displayed as recommended in the handheld documentation—through error dialogues which inform the user of the failure condition. In the case of a Palm handheld computer, the system application of the present invention requires Palm O/S 2.0. If the application is loaded onto a handheld computer with an earlier version of the operating system, it will not operate. However, the software will exit the application gracefully without causing the handheld computer to lock up or reset. When there is a problem opening the RS232 serial communication port, the user will be informed of the problem by a message dialog. The system application of the present invention will not run when there is insufficient memory to handle its dynamic memory requirements. If memory problems occur during operation, the user will be notified via a message dialog; it will not cause lock-up or device reset. The memory space of the handheld computer will always be a function of the scope of applications for which the handheld computer is utilized. The application cannot regulate the allocation of general purpose memory; however, it can monitor it. It will issue warnings when memory on the handheld computer is becoming low.

When the handheld application is looking for the start of a particular communications message, it is possible to see a false synchronization sequence (D1, D2) embedded in the data of a message. Since the parser buffers an entire message prior to processing it, the received checksum will typically not match in these cases and the system will be forced to resynchronize. In a very small number of cases (0.39%) the checksum will match and the parser will attempt to process the message. If it recognizes PIDs within these message strings, data items may take on erroneous values; however, the chance of all these factors occurring simultaneously (a data string that matches D1, D2 during synchronization, a correct checksum, and recognized PIDs within the data) is statistically insignificant.

The adapter status message provides information to the application about such things as communication overruns and battery level. The application monitors and displays this information to the user so he or she can proactively respond to situations which might lead to erratic adapter behavior.

The adapter tracks communications overrun errors and informs the application of any problems. On startup, the adapter waits for an idle line before buffering messages. If a powered adapter is attached to an active datalink, the initial message that is buffered and passed along to the handheld computer may be invalid. Logic to detect these errors is in the SDM portion of the application software. Overrun errors are detected by the adapter and communicated in the status message to the system application of the present invention. Overrun errors are included as part of the status message.

The robustness of adapter software deals primarily with its ability to handle invalid messages or messages of invalid length. The adapter software carries out bytewise collision detection. That is, if a different byte than the transmitted one is detected in the receive buffer, it backs off the datalink. Basically, when the adapter has a message to transmit, it waits for an idle time on the datalink corresponding to its priority (in this case, 8). If it transmits out a byte, but does not see this same byte in its receive buffer, a collision has been detected. When a collision is detected it again waits for an idle time corresponding to its priority. To avoid synchronized collisions with devices of identical priority, on the $3^{rd}$ consecutive collision, the device utilizes a random priority on the subsequent retransmission. For J1708/J1587 communications, the adapter only processes messages that are within the 21 byte limit. Extended messages will not be processed. The adapter measures relative throughput as an indication of how effectively it is handling the current saturation of the datalink. The throughput measure is included in the status message.

Conduit errors include errors which occur during the transfer of data files from the handheld computer to a PC. Any errors in opening, reading or writing the PC resident data file will be communicated to the user via message window. Errors in the syncing communication process will be handled by the sync manager software, e.g. Hot Sync Manager for Palm devices. The data file on the PC is backed up prior to the execution of the conduit. If the conduit data transfer is interrupted, the original backup file can be recovered. If the data file version that exists on the PC is incompatible with the data records which are being transferred across the conduit, then a dialog box will inform the user of the details of the problem.

The following section describes further the software functional requirements for the vehicle data system of the present invention. The requirements are organized into the following functional components:

1. Adapter Software
2. Handheld Data Link Software (HDL)
3. Handheld Application Software
4. PC Conduit Software With the exception of the HDL and Handheld Application software, all of the components reside on separate hardware platforms; that is the HDL and Handheld Application Software reside on the handheld computer.

1 General Software Requirements
1.1 Handheld Computer Support

The selection of base platform support is based upon the proliferation of handheld computers in the field. These requirements are subject to change in later versions of the product; however, it is not anticipated that earlier versions than those specified here will need be supported.

SW.GEN.1 In the preferred embodiment, the system shall support the following various handheld computers using the Palm 2.0 O/S including: Palm Pro, Palm III, Palm IIIx, Palm VII, and future handheld computers that maintain backward compatibility with this product series.

SW.GEN.2 The system shall support handheld computers with Palm 2.0 O/S and future operating systems that maintain backward compatibility with Palm 2.0 O/S.

SW.GEN.3 The application shall "gracefully terminate" when loaded and executed on a Handheld computer with an incompatible ROM.

SW.GEN.4 The conduit software shall be compatible with Windows 95 software, Windows 98 and Windows NT.

1.2 Version Identification

The ease of proliferating version upgrades over the internet creates the potential for several simultaneous versions to coexist in the field; therefore, it is important to maintain the capability of distinctively identifying a user's version SW.GEN.5 The application shall contain an 'about box' which lists the version number of the handheld application and the build date for that particular release.

SW.GEN.6 The 'about box' shall contain a version number of the Adapter Software which is obtained via the adapter status message.

2 Software Functional Requirements
2.1 Adapter Software Requirements

The adapter is responsible for the packaging up of J1587 (RS485) messages to and from the handheld computer (RS-232). In addition to the required voltage level conversion, the adapter is also responsible for detecting message termination, and detecting bus idle times sufficient enough to schedule the transmission of handheld computer originated messages. The latter is where the software comes in to play. The following requirements apply to the software that is contained in the adapter:

SW.PDL.1 The adapter shall be capable of receiving standard J1587 messages.

SW.PDL.2 The adapter shall be capable of handling 100% bus utilization with J1587 when all messages are standard 21 byte (or less) messages.

SW.PDL.3 The adapter software shall implement the low-level detection of J1587 message termination.

SW.PDL.4 The adapter shall not be required to perform any J1587 message validation.

SW.PDL.5 The adapter shall package standard J1587 messages and transmit to the handheld computer. Each message shall be proceeded by the following three-byte sequence: [112][254][len], where len is the total length of the packaged J1587 message.

SW.PDL.6 The adapter shall be capable of receiving handheld computer messages which are framed as follows: [120][254][len][J1587 Message], where J1587 message is a standard J1587 formatted message.

SW.PDL.7 The adapter shall be cable of buffering up to two complete (25-byte) handheld computer messages.

SW.PDL.8 The adapter software shall unpack received handheld computer messages and schedule them to be transmitted on the J1587 data link.

SW.PDL.9 The adapter shall transmit messages onto the J1587 bus whenever a complete message is present and the bus has been inactive for the required amount of time based on the priority of the message.

SW.PDL.10 The default priority of all adapter transmitted J1587 messages shall be 8.

SW.PDL.11 During J1587 transmission, if three consecutive collisions occur the adapter shall reschedule (via the priority) the colliding message by randomly selecting a different message priority.

SW.PDL.12 The adapter shall monitor its battery voltage at least once every 60 seconds.

SW.PDL.13 The adapter software shall monitor each message queue and maintain the maximum depth each queue has reached.

SW.PDL.14 The adapter shall detect spurious interrupts if they exist.

SW.PDL.15 The adapter shall maintain some indication of the available CPU throughput.

SW.PDL.16 The adapter shall transmit a status message at least every 60 seconds.

SW.PDL.17 The adapter's status message shall contain the following information: firmware major and minor version, battery voltage, message queue depths, spurious interrupt indication, and the latest throughput value.

2.2 HDL Software Requirements
2.2.1 J1587 Fault Detection

The HDL software is responsible for monitoring messages on the J1587 datalink. When a device MID supported by the Handheld data link(currently, only MID 128 is supported) transmits a PID 194 message, the HDL software is responsible for buffering the related fault information so that it is accessible to the handheld application. The HDL must track updates as the PID 194 message is broadcast by the device and reset when the datalink is disconnected from the transmitting device. The following requirements apply to this functionality:

SW.ADP.1 The HDL shall monitor and buffer fault information broadcast in a PID 194 message for devices on the J1587 datalink communicating with a 128 MID (engine MID).

SW.ADP.2 The HDL shall buffer the following information related to J1587 faults for any device on the datalink with a supported MID: PID/SID, FMI, count, active/inactive status. The HDL shall distinguish values that are not available with unique identifiers. (e.g. if the fault count is not provided, the HDL must distinguish this as an unknown value.)

SW.ADP.3 For Cummins engines, the HDL shall generate a cross-reference of PID/SID and FMI values to a Cummins code according to ESN 10745.

SW.ADP.4 The HDL shall be capable of buffering 20 active and 20 inactive faults simultaneously. If more than 20 faults are active on the device, the HDL will buffer the first 20 faults in the order broadcast by PID 194. If more than 20 faults are inactive on the device, the HDL will buffer the first 20 inactive faults in the order broadcast by PID 194.

SW.ADP.5 If the PID 194 message indicates an active fault has gone inactive, its status will change immediately. An active fault that has not been refreshed for 10 seconds (and has not been received as inactive) will have its status changed to inactive.

SW.ADP.6 Approximately every 10 seconds (±5 sec) the device will issue a PID 194 request to trigger an update of all active and inactive faults. An inactive fault that has not been refreshed in 30 seconds shall be deleted from the list of inactive faults.

SW.ADP.7 When the datalink becomes inactive, the fault buffers shall be cleared.

SW.ADP.8 The HDL shall provide an interface to the application to allow access to all fault information as well as the status of datalink activity.

2.2.2 J1587 PID Processing

In addition to the processing of the J1587 fault PID (194), the HDL is also responsible for monitoring select parameter information PIDs. This can be information such as live vehicle data or vehicle information parameters. Often the associated PIDs are broadcast onto the J1587 by a device at a periodic interval; however, many of the desired parameters must be specifically requested by the HDL. The HDL is responsible for updating this equate rate.

Initially, the HDL must support a fixed set of PIDs. It may be required to make expansion of supported PIDs a user programmable feature; however, such programmabilty is not currently required.

SW.ADP.9 The HDL shall continuously monitor and buffer the engine operating parameters listed in the following table:

| PID | Parameter | Range | Data Bytes |
|---|---|---|---|
| 51 | Throttle Position | 0–102% | 1 |
| 92 | Engine Load | 0–127.5% | 1 |
| 93 | Torque | −2560–2540 lbf-ft | 1 |
| 100 | Oil Pressure | 0–879 kPa | 1 |
| 102 | Boost Pressure | 0–219.8 kPa | 1 |
| 105 | Intake Manifold Temp | 0–255° F. | 1 |
| 110 | Coolant Temperature | 0–255° F. | 1 |

-continued

| PID | Parameter | Range | Data Bytes |
|---|---|---|---|
| 111 | Coolant Level | 0–127.5% | 1 |
| 183 | Fuel Rate | 0–0.284422 gal/s | 2 |
| 190 | Engine Speed | 0–16383.75 rpm | 2 |

SW.ADP.10 The HDL shall monitor and buffer the vehicle operating parameters listed in the following table when requested by the application.

| PID | Parameter | Data Bytes |
|---|---|---|
| 74 | Maximum Road Speed Limit | 1 |
| 86 | Cruise Control Set Speed | 1 |
| 235 | Total Idle Hours | 4 |
| 236 | Total Idle Fuel Used | 4 |
| 245 | Total Vehicle Distance | 4 |
| 246 | Total Vehicle Hours | 4 |
| 247 | Total Engine Hours | 4 |
| 248 | Total PTO Hours | 4 |
| 250 | Total Fuel Used | 4 |
| 237 | Vehicle Identification Number (VIN) | Variable |
| 243 | Component Identification Parameter | Variable |
| 234 | Software Identification | Variable |

SW.ADP.11 If parameters that the HDL is required to monitor are not broadcast, the HDL shall send a PID 0 request to obtain them. The HDL shall be capable of continually requesting the PID on a periodic basis.

SW.ASP.12 If all data traffic stops for a period of 2 seconds, the device will issue a standard engine parameter request to test datalink activity. If an additional second passes and nothing has been received, the datalink will be considered "dead" or "disconnected" and all data buffers will be reset to default values. This status shall be communicated to the handheld computer application.

SW.ADP.13 If a PID 0 request has been sent to a device and the datalink is not "dead" and no reply to that request has been received after a period of 2 seconds then the data item will be labeled as unavailable and this information will be communicated to the application. Once the parameter is received, it will be updated and the status reset.

SW.ADP.14 The HDL shall track the time of received parameter information. If the data becomes older than a limit which is configurable by the application, then the data will be labeled as 'stale' and this information will be communicated to the application.

SW.ADP.15 The HDL shall provide an interface to the application to allow access to all parameter data as well as the status of datalink activity.

2.2.3 Adapter Status Processing

When the adapter is powered, it issues a status message on a periodic basis which updates listening handheld computer applications of various conditions such as battery level and datalink traffic. The HDL is responsible for processing all adapter status information and making it available to the application.

SW.ADP.16 The HDL shall buffer the status of the adapter's battery level, the datalink traffic/adapter throughput indicator, and adapter communication error status.

SW.ADP.17 The HDL shall buffer the version of the adapter software.

SW.ADP.18 The HDL shall make adapter status information available to the application.

2.2.4 Data Plate Processing

When the adapter is communicating with a Cummins Engine, it can obtain information about the identification of the machine. This information is referred to as the data plate.

SW.ADP.19 For all modules that follow GTIS 3.5 or higher, the HDL shall be able to identify the following data plate information: Engine Serial Number (Component ID), Software ID, and Unit Number.

SW.ADP.20 The HDL shall communicate when data plate information is not available to the application.

2.3 Application Requirements

2.3.1 Engine Operating Parameter Display

The handheld computer application is responsible for displaying the engine operating parameters. A form will be created which displays these parameters. The purpose of this screen is to provide the user with the ability to view engine-operating conditions.

SW.APP.1 The handheld application shall allow the display of all operating parameter PIDs that are processed by the HDL (see SW.ADP.9.) The parameters shall be displayed with a description, value and unit for each parameter.

SW.APP.2 The broadcast parameters shall be refreshed on the screen at a rate of once per second. In the event the broadcast rate for a parameter is slower than the display update rate, the display for that parameter may be updated at the slower rate.

SW.APP.3 Request parameters shall be updated on the screen using a rate the user selects for the request. This rate shall not be faster than once per second.

SW.APP.4 In the event that no data is received for an Engine Operating Parameter, the application shall display the text 'No Data' in the value field.

SW.APP.5 If the expected broadcast time (the broadcast rate and a variable delay) has expired and no data has been received, the data is consider stale. In this situation, the application shall invert the display of the data to indicate the data is stale. If a subsequent broadcast is received, this data display shall return to normal.

SW.APP.6 If the data link is disconnected or no data is received for any parameters, the application shall display 'No Data' for all the Engine Operating parameters.

SW.APP.7 The application shall indicate the status of the data link. These statuses are connected, slow, or disconnected.

2.3.2. Vehicle Information

The handheld application is responsible for collecting, storing and displaying a defined set of data known as the Vehicle or Trip Information. This feature collects information about the usage and status of a machine over a given period of time. The relevant parameters are totals and identification parameters. They are not broadcast and must be requested by the handheld application.

SW.APP.8 The user shall be provided the capability for initiating requests for trip parameters on the application. Automatic requests shall be issued by the application when the user enters the Trip Information form and when the datalink becomes active after a period of 'no connection.'

SW.APP.9 Until data is received for a Trip Parameter request, the application shall display 'No Data' in the value field.

SW.APP.10 In the event a trip parameter is not received from the module within 5 seconds of the request, the parameter is assumed to be not valid data for the ECM. The application shall then show 'Not Supp' on the screen to indicate this situation.

SW.APP.11 If the data link is disconnected or no data is received for any parameters, the application shall display 'No Data' for all the trip parameters.

SW.APP.12 The serial number received from the Component Identification PID and the date of the upload shall be used to identify the trip data records. If the ECM does not support these messages then the user shall be prompted to enter the serial number to identify the data. If no serial number is acquired or entered the data will not be stored.

SW.APP.13 The user shall be provided the capability to enter the serial number to identify the data in order to override the received data from the Component Identification PID.

SW.APP.14 The user shall be provided the capability of initiating data storage to the handheld computer. The Trip Data shall be stored after it has been received on the handheld computer. A trip record consists of the values received from all trip parameters (or values tagged as unsupported). The data shall distinguish unavailability of information from valid data.

SW.APP.15 The user shall be provided the capability of initiating vehicle and fault data storage with a single action. (See section 2.3.3)

SW.APP.16 The device shall be capable of storing at least 250 unique trip records (in addition to other required storage.) It shall display an approximate remaining record count based on available memory and average record size.

2.3.3 Fault Information Display

Faults will be received and displayed on the handheld computer application. The HDL layer defines the limitations on the number and type of faults. The faults shall consist of two lists, one for active and one for inactive faults. The Application will be responsible for displaying and storing the fault information.

SW.APP.17 A list of the faults from a Cummins engine shall be displayed using the appropriate Cummins fault code. If there is no fault code mapping for the fault the MID, PID or SID, and FMI combination will be displayed.

SW.APP.18 A list of the faults from non-Cummins engines shall be displayed using the MID, PID/SID and FMI.

SW.APP.19 All faults shall be displayed with their count (if available) and status on the list screen.

SW.APP.20 The user shall be provided the capability of selecting a fault for further information. This information shall inform the user how to handle the fault condition.

SW.APP.21 The user shall be provided the capability of storing fault information to a data file. The MID, PID/SID, FMI, PID/SID indicator, count; status, Cummins Fault Code or 0, textual description and upload time shall be stored in the handheld for each fault.

SW.APP.22 The device shall be capable of storing at least 250 unique fault records (in addition to other required storage.) It shall display an approximate remaining record count based on available memory and average record size.

SW.APP.23 The serial number received from the Component Identification PID and the date of the upload shall be used to identify the fault data records. If the ECM does not support these messages then the user shall be prompted to enter the serial number to identify the data. If no serial number is acquired or entered the data will not be stored.

SW.APP.24 The user shall be provided the capability to enter the serial number to identify the data in order to override the received data from the Component Identification PID.

2.3.4 Manual Entry Forms

The application provides manual entry forms in order to track supplemental information or support equipment that is without an electronic datalink. In addition, there are manual entry overrides to correct records in the case that datalink identification messages are incorrect (e.g. the data plate holds an incorrect identification.) These forms will be expanded and revised according to user feedback.

SW.APP.25 The application shall allow the user to enter a unit identification number to be associated with the data records for that equipment.

SW.APP.26 The application shall allow the user to override any serial numbers that are attained via datalink communication.

SW.APP.27 The application shall provide an entry form to be utilized for manually entering engine hours and total miles.

SW.APP.28 The application shall provide an entry form to be utilized for manually entering diagnostic notes and maintenance actions performed. Each note entry shall allow up to 1000 characters of text.

2.3.5 Handheld Database Requirements

The handheld computer database is the data storage structure for all data collected and the textual descriptions of faults, parameters, units and statuses. The database will manage the data for display and upload to the PC.

SW.APP.29 The trip information shall be stored as a record identified by serial number, unit ID, and upload time.

SW.APP.30 The fault information shall be stored as a record identified by serial number, unit ID, and upload time.

SW.APP.31 The data plate information shall be stored as a record identified by serial number, unit ID, and upload time.

SW.APP.32 The manual forms information shall be stored as a record identified by serial number, unit ID, and entry time.

SW.APP.33 The data stored on the handheld shall be available for upload across the handheld conduit. It shall be stored as 'archive' so that the synchronization process will delete the records on the handheld as they are moved to a PC.

SW.APP.34 The data stored on the handheld shall be available for review using the handheld device. The user identifies the data using the serial number and unit ID.

SW.APP.35 The application shall give the user the capability of deleting data, a single record at a time.

SW.APP.36 Textual description of PIDs, faults, and units shall be stored in a database. This allows multi-language support by swapping the text description databases with the appropriate language.

2.4 Conduit Requirements 2.4.1 Handheld Conduit

The Conduit is the handheld computer's mechanism for transferring data to and from the handheld computer and a PC. The Conduit is a Windows DLL that is called by the handheld sync software, such as the Palm HotSync manager, during handheld computer synchronization events. The purpose of the Conduit is to transfer acquired data (trip and fault) from the handheld computer to the PC where it can then be further analyzed. The following list of requirements pertains to the Conduit subsystem.

SW.CON.1 A mechanism shall exist which allows for the installation of the Conduit on the user's desktop.

A mechanism shall exist which provides support for the un-installation of the Conduit from the user's desktop.

The Conduit shall date/time stamp all records as they are stored on the PC.

The Conduit shall write data plate information (as described in the database section above) to a global, comma-separated file. The term global refers to a file which is not stored under a given handheld users' specific directory.

The Conduit shall write engine vehicle data (as described in the database section above) to a global, comma-separated file. The term global refers to a file, which is not stored under a given handheld user's specific directory.

The Conduit shall write engine fault data (as described in the database section above) to a global, comma-separated file. The term global refers to a file that is not stored under a given handheld user's specific directory.

In either data's case (trip or fault), the Conduit shall append incoming data to the respective output file if it already exists vs. overwriting the file.

In the event the Conduit's output file does not exist, the Conduit shall create the file.

The following is an extract from Cummins QuickCheck User's Manual© 2000 that further describe the handheld device, which is commercially known as QuickCheck, and its application.

QUICKCHECK USER'S MANUAL APPLICATION

The QUICKCHECK application, in conjunction with the QUICKCHECK datalink adapter, allows you to read and capture select SAE J1587 engine data. This data includes equipment identification, fault information, current operating parameters, and total trip information.

With QUICKCHECK, you can:

Read and store equipment identification

Read and store both active and inactive engine faults

Monitor engine operating parameters, such as engine rpm, coolant temperature, oil pressure Read and store vehicle total trip information, such as total fuel consumed, total engine hours, total idle hours Adapter Installation The QUICKCHECK application uses the QUICKCHECK datalink adapter to connect it to the vehicle's J1587 public datalink. It is similar in structure to the modem for the handheld organizer, but is designed to perform as a datalink adapter, similar to the Cummins INLINE™ datalink adapter, and hence will not double as a modem.

A special cable is shipped with the QUICKCHECK datalink adapter. The adapter end of the cable has a standard 4-pin modular phone-style plug. The other end connects to the J1587 datalink connector/adapter on the engine or in the vehicle and is available in two configurations: a 6-pin or a 9-pin Deutsch connector. Slip the QUICKCHECK datalink adapter onto the bottom of the handheld organizer, slide the Spin plug into the adapter and connect the Deutsch connector end of the cable to the J1587 datalink connector.

Activating QUICKCHECK

Once installation is complete, the QUICKCHECK application icon appears in the handheld organizer's application launcher. Tap the icon to launch the QUICKCHECK application.

Equipment Screen

Once the QUICKCHECK icon is tapped, the Equipment screen appears, as shown in FIG. 27. This screen, along with the Monitor and Trip screens described later, is considered to be a main screen. Each main screen contains some of the same information (such as faults or connection status) and controls. This allows certain information and functionality to be available in multiple places in the application.

This section serves to document the repeated information for all screens. A fourth screen, the Fault screen (also a main screen), is discussed later.

The Equipment screen contains several screen object—each pointed out in the picture below and described in the paragraphs that follow.

Equipment List

This pop-up box is available only in the Stop mode. It lists equipment QUICKCHECK has already identified by prior connection. The application uses the information contained in the list box in future downloads (in Auto or Save mode) if it determines it has been connected to this engine before. If the handheld is not currently hooked up to an engine, this pop-up can be used with the past download Record List pop-up to look at previously stored engine information (Equipment, Fault and Trip).

Parameter Value Validity Strings

Three of the four screens (Equipment, Monitor and Trip) convey data validity information for a given value. This easily lets you know whether a given value has been received or is up to date. In Live or Auto mode, if the screen is displaying what appears to be normal information for a given parameter, it is the most recently received information. If the information becomes out of date, the values are displayed in reverse video. In addition, the fields can contain strings that convey the validity status of a given parameter. For example, Disconnected or Unavailable is displayed if the data is not accessible.

Screen Selector

The Screen Selector, as shown in FIG. 28, is used to choose the four screens mentioned earlier:

Equipment (default screen on startup)

Fault

Monitor

Trip

Tap the Screen Selector arrow to bring up the pop-up that contains the four choices. Tap the desired choice to go directly to the screen you want or by tapping the organizer Menu icon button.

Connection and Data Saving Status

This message contains information about either the connection status or the data-saving status. Messages such as Communicating, Datalink Down and Saving Data are some of the phrases displayed in this area of the screen.

When using QUICKCHECK, glance at this portion of the screen for an idea of the current overall status of the application.

Connection Mode

The Connection Mode, as shown in FIG. 29, controls QUICKCHECK's mode of operation. Selecting Auto allows QUICKCHECK to query all savable data (equipment, fault, and trip) and store it, based on its determination of which piece of equipment it is connected to. If the application recognizes the current equipment, it attempts to save the data without the user having to manually intervene. The Live option allows the application to connect with the engine and monitor information, but does not automatically store retrieved data. The Save option stores the current data set. Stop is used to disconnect the device from the datalink and review previous downloads, using the Equipment List and Record List pulldowns.

Active/Inactive Faults

This control, as shown in FIG. 30, allows you to select which faults—active or inactive—are displayed and/or saved. Active faults are those currently present on the engine control module (ECM) or other diagnostic device. Inactive faults allow you to see old fault occurrences stored on the ECM.

Faults List

This area lists all faults (active or inactive) being broadcast on the datalink. Tapping on a fault in the list takes you directly to the Fault main screen where more information is displayed about the selected fault.

Trip Screen

The Trip screen, as shown in FIG. 31, has a data list box similar to the equipment data list box on the Equipment screen. On the screen is aggregate trip information such as total fuel consumption, total vehicle miles and total engine hours.

You can scroll the data with the scroll bar located on the right side of the handheld organizer's screen. Activate it by using either the stylus or the scroll keys.

Adapter Status Screen

The Adapter Status screen displays information about the QUICKCHECK datalink adapter, for example the adapter firmware version, adapter battery level and datalink status. This screen is in the options pulldown list that is accessible via the menu button located on the handheld organizer.

BASIC TUTORIAL

This section describes a typical data-gathering session. It begins with collecting (scanning) the data, reviewing previously collected data, then downloading the saved data to the PC using the HotSync process and finally how to remove QUICKCHECK stored data from the handheld. This tutorial assumes the handheld organizer will be connected to a vehicle that it has not been previously connected to and the user is familiar with Palm Computing handheld organizer standard operations. It also assumes batteries are installed in the QUICKCHECK datalink adapter. The QUICKCHECK datalink adapter does not come with the batteries installed. The Battery Installation section of the document describes how to install the batteries in your adapter.

Attach the QUICKCHECK datalink adapter to the bottom of the handheld organizer. Select the appropriate datalink cable whose datalink connector mates with the public datalink connector of the equipment's wire harness. Evenly engage the 4-pin plug of the datalink cable into the datalink adapter and the 6 or 9 pin connector into the vehicle's J1587 public datalink connector on the equipment harness or on dash connector. (See equipment Owner's Manual for identification and location of the public datalink connector.) Engine should be keyed "On". Tap the QuickCheck application icon. If the Connection Mode (lower left corner of the screen) indicates either Live or Auto, the QUICKCHECK application immediately attempts to connect to the ECM. If the Connection Mode is not set to either, select Live now.

Next verify that you are in the Equipment screen. If QUICKCHECK was entered from the handheld organizer's application launcher, Equipment is the default screen. If the current screen is other than Equipment (i.e. Fault, Monitor or Trip), select Equipment from the Screen pulldown list at the top right.

When QUICKCHECK first connects to a vehicle, it tries to locate the engine's Make, Model and Serial No (serial number). If the vehicle is communicating with QUICKCHECK, the fields on the Equipment screen are filled in as information is scanned, but the Equip Id field is blank. This field is filled in by the user, the first time a vehicle is scanned. Touch to the right of the Equip Id label to enter the data entry mode. Using standard Palm Computing text methods (graffiti, keyboard, etc.), enter a name or label that is user friendly and easy to remember. The next time someone connects to this vehicle with this handheld, the QUICKCHECK application will search its past records and fill in the Equip Id field with the name you entered.

You should still be looking at the Equipment screen where the engine Make, Model and Serial No are listed, along with Eng. Hrs (engine hours), VIN (vehicle identification number), and Soft ID (software ID). Not all fields are visible at the same time but can be seen by scrolling the list. If a field is displayed as Initial, Unavailable or Disconnected, QUICKCHECK is indicating this particular piece of information has not been received on the datalink or QUICKCHECK may not be connected correctly. Check your connections to be sure that is not the problem.

If faults[5] are present, you will see them listed in the Faults List box located in the lower portion of the screen. Selecting any fault takes you immediately to the Fault screen, which displays more details about the selected fault.

Next choose Monitor from the Screen selector at the top. This screen shows current engine operating information (sensor information such as engine speed, coolant temperature, oil pressure) in real time as the ECM broadcasts it. Any parameters not scanned by QUICKCHECK are displayed as Initial or Unavailable. Like the Equipment screen, faults are displayed in the fault list box.

Choose Trip Screen selector at the top to display engine and vehicle trip information (total hours, total miles, fuel used, etc.).

You can switch between the Equipment, Fault, Monitor and Trip screens at any time. Note that the Equipment and Trip screens contain nonchanging information while the Fault and Monitor screens are continually updated.

At this time, select the Save setting of the Connection Mode control located at the bottom left of the Equipment, Monitor or Trip screen. This initiates the datasaving mechanism of QUICKCHECK. The application saves the current values for the equipment, fault and trip information. This information is time stamped and can be viewed later, even when QUICKCHECK is not connected to the engine.

You can view previously stored data on the handheld by selecting the Stop setting of the Connection Mode screen control. When Stop is selected, two pulldowns are available: one above the Equipment ID at the top of the screen to choose the equipment you want to see; and one to the right of the Fault list with a list of dates and times if any. Once a piece of equipment is selected, the other pulldown will contain entries that are in date/time format. This allows you to select which download is currently viewable.

CONDUIT

The Palm Computing HotSync Manager oversees the process of synchronizing data. The handheld organizer uses a conduit to transfer data to and from the user's PC. However, with QUICKCHECK, data can only be transferred one way-from the handheld organizer to the PC. This allows the PC to unload data from the handheld and free up memory.

Customization

Conduit customization is achieved by accessing the HotSync Manager[6] by right clicking the icon located in the bottom right portion of the PC screen and choosing Custom. Currently, the only options are to allow the conduit to transfer data from the handheld organizer to the PC or to disable the conduit altogether.

To transfer data, select either the Synchronize the files7 or the Handheld overwrites Desktop option. To disable the conduit, select the Do Nothing option. The conduit does nothing in the Desktop overwrites handheld mode because data can only be transferred one way—from the handheld organizer to the PC.

Data

The conduit transfers three types of information from the handheld organizer to the PC—equipment, fault and trip. It creates and maintains three "globally accessible" files, one for each type of data. The files are named equip.txt, faults.txt and trips.txt. Each file is appended every time a HotSync process occurs, regardless of which user performs the process. This is different from what normally happens during HotSync synchronization; usually the system separates information by user.

In addition to appending new information onto the end of these files, backup versions are maintained, in case something catastrophic happens during a given HotSync process.

Upon a successfull synchronization of QUICKCHECK data, the conduit instructs the handheld organizer to remove the downloaded fault and trip records from the handheld organizer, freeing memory for future downloads or other application data. As a result, all fault and trip data older than the last synchronization is not available to be examined on the handheld organizer, only on the PC.

Location

The location of the HotSync output files are as follows:

[palm root8]\quickchk\equip.txt

[palm root]\quickchk\faults.txt

[palm root]\quickchk\trips.txt

The backup copies of these files are stored in the same directory but have the extension .bak instead of .txt.

Formats

The conduit writes in spreadsheet-compatible, comma-separated value (CSV) file format. Each entry or record is a single line with multiple fields, separated by commas. This allows files to be easily imported into a program such as Microsoft Excel for further analysis.

FAULTS FILE FORMAT

The faults.txt file has the following format in which the data-type possibilities are numbers or textual strings:

1, Tuesday Feb. 15 2000 15:19:27,9799.350000,362,6, 251,128,4,1,Fuel Pump ECM, CAN Communication Error:Volt

Fault File Format

| Field Name | Description |
|---|---|
| Equipment Identifier | Number—index into equipment table |
| Download Time Stamp | String—date and time of download from equipment |
| Total Engine Hours | Number—in hours |
| Fault Code | Number—Cummins fault code if applicable |
| Flags | Number Bit Field—0x01 set if PID (vs. SID) 0x02 set if fault active 0x04 set if Cummins fault code is valid |
| Fault Identifier | Number—PID or SID depending on flag value |
| Message Identifier | Number—(sometimes referred to as MID) |
| Fault Mode Indicator | Number—(sometimes referred to as FMI) |
| Fault Count | Number—number of occurrences of fault |
| Fault Description | String—text string describing the fault |
| Time of HotSync | String—date and time of HotSync operation |

TRIPS FILE FORMAT

The trips.txt file has the following format:

1, Tuesday Feb. 15 2000 15:19:27,503,799.35,1646.0, 1148.8,8178.1,0,10.0,5.8,79.0,0, Tue Feb 15 16:16:03 2000

Trip File Format

| Field Name | Description |
|---|---|
| Equipment Identifier | Number—primary key of this table Other tables use this value. |
| Download Time Stamp | String—date and time of download from equipment |
| Valid Flag | Number—(bit field) |
| Total Engine Hours (0x01$^9$) | Number—in hours |
| Total Idle Hours (0x02) | Number—in hours |
| Idle Fuel Used (0x04) | Number—in gallons |
| Total Vehicle Distance (0x08) | Number—in miles |
| Unused | Unused |
| Total PTO Hours (0x20) | Number—in hours |
| Total Fuel Used (0x40) | Number—in gallons |
| Max Road Speed Limit (0x80) | Number—in miles |
| Cruise Control Set Speed (0x100) | Number—in miles per hour |
| Time of HotSync | String—date and time of HotSync operation |

What is claimed is:

1. An vehicle data system for processing and displaying vehicle data transmitted through a bus connector of a data bus on an electronically controlled engine operating in accordance with a predetermined bus protocol, comprising
   a. a handheld computer including a memory for storing operating system software adapted to operate said handheld computer in accordance with a data protocol which is different from the vehicle bus protocol, a handheld microprocessor for executing the operating system software and an external data port which is physically incompatible with the bus connector of the data bus and which is connected to said handheld microprocessor to allow the vehicle data when properly formatted to pass into said handheld computer; and
   b. an adapter for creating a data pathway between the bus connector and said external data port including
      i. a data port connector for connection with said external data port of said handheld computer,
      ii. a bus compatible connector for connection with the bus connector,
      iii. a battery power supply separate from the power supply for said handheld computer and for the data bus, and
      iv. an adapter microprocessor supplied with power from said battery power supply and connected via the data pathway with said bus compatible connector for protocol conversion of the data received from the vehicle bus for processing by said handheld computer and supplied to said handheld computer through said data port connector,
   wherein the signal levels of the vehicle data appropriate for transmission by the vehicle bus and for processing by said handheld computer are respectively different and wherein said adapter includes level adjustment means for converting the signal levels of the vehicle data to the appropriate levels as the vehicle data passes between the vehicle bus and said handheld computer.

2. The vehicle data system as defined in claim 1, wherein said adapter further includes
   a. a flexible cable having said bus compatible connector at one end and a cable connector at the other end, and
   b. an adapter housing capable of being affixed to said handheld computer when said data port connector is connected to said external data port, said adapter housing including a cable compatible connector for engagement with said cable connector to complete the data pathway between the data bus and said adapter microprocessor.

3. The vehicle data system as defined in claim 1, wherein the data bus transfers data messages containing information regarding the engine and wherein said adapter microprocessor operates to convert the vehicle data between the bus protocol and the data protocol of said handheld computer.

4. The vehicle data system as defined in claim 3, wherein said adapter microprocessor determines the start and stop of messages received from the data bus and said adapter microprocessor further operates to add message identifiers to the vehicle data conveyed to said handheld computer through said external data port.

5. The vehicle data system as defined in claim 4, wherein said handheld computer includes application software for permitting detection of said message identifiers added to the vehicle data by said adapter microprocessor.

6. The vehicle data system as defined in claim 5, wherein the vehicle bus operates in accordance with a J1587 protocol.

7. The vehicle data system as defined in claim 5, wherein the vehicle bus operates in accordance with a J1939 protocol.

8. The vehicle data system as defined in claim 5, wherein the data protocol of said handheld computer is an RS232 data link.

9. The vehicle data system as defined in claim 6, wherein the vehicle bus employs a J1708 data link.

10. The vehicle data system as defined in claim 4, wherein the message identifier includes a delimiting header block having a synchronization sequence and a message length.

11. The vehicle data system as defined in claim 5, wherein the application software within said handheld computer operates to synchronize with the messages received from said adapter employing the header block added by said adapter.

12. An vehicle data adapter system for creating a data pathway between a bus connector of a data bus on an electronically controlled engine operating in accordance with a predetermined bus protocol to convey data messages and a handheld computer which operates in accordance with a data protocol which is different from the vehicle bus protocol wherein the handheld computer includes an external data port which is physically incompatible with the bus connector of the data bus, comprising:

a. an adapter housing external to the handheld computer, b. an adapter microprocessor included in the data pathway between the data bus and the handheld computer, said adapter microprocessor being mounted within said adapter housing, c. adapter memory for storing adaptor software for implementation by said microprocessor to perform the functions of the adapter system including protocol conversion of vehicle data transferred between the data bus and the handheld computer, d. a data port connector for connecting the data pathway with the external data port of the handheld computer to allow vehicle data to be transferred to and from the handheld computer, and e. a bus compatible connector for connecting the data pathway with the bus included in the data pathway for connection with the bus connector of the vehicle bus to allow vehicle data to be transferred to and from the vehicle bus, wherein said adapter microprocessor operates to convert the vehicle data between the bus protocol and the data protocol of said handheld computer by determining the start and stop of messages received from the data bus and said adapter microprocessor further operates to add message identifiers to the vehicle data conveyed to the handheld computer through said external data port, whereby the amount of processing that the handheld computer is required to undertake for data monitoring and extraction from the data bus is minimized, wherein the signal levels of the vehicle data appropriate for transmission by the vehicle bus and for processing by said handheld computer are respectively different and wherein the adapter system further includes level adjustment means for converting the signal levels of the vehicle data to the appropriate levels as the vehicle data passes over the data pathway between the vehicle bus and the handheld computer.

13. The vehicle data adapter system as defined in claim 12, wherein the message identifier includes a delimiting header block having a synchronization sequence and a message length.

14. The vehicle data adapter system as defined in claim 13, wherein the message identifier includes a three-byte sequence: [112][254][len][J1587Message] where J1587 Message is a standard J1587 formatted message.

15. The vehicle data adapter system as defined in claim 13, further including application software implemented by the handheld computer for permitting detection of said message identifiers added to the vehicle data by said adapter microprocessor.

16. The vehicle data adapter system as defined in claim 12, further including a flexible cable forming a portion of the data pathway, said flexible cable having said bus compatible connector at one end and a cable connector at the other end, and wherein said adapter housing is capable of being affixed to the handheld computer when said data port connector is connected to the external data port of the handheld computer, said adapter housing including a cable compatible connector for engagement with said cable connector to complete the data pathway between the data bus and said adapter microprocessor.

17. The vehicle data adapter system as defined in claim 12, wherein said adapter software allows engine operating conditions to be monitored.

18. The vehicle data adapter system as defined in claim 17, wherein said adapter software allows one or more of the following engine operating conditions to be monitored: throttle position, engine load, torque, oil pressure, boost pressure, intake manifold temperature, coolant temperature, coolant level, fuel rate, and engine speed.

19. The vehicle data adapter system as defined in claim 12, wherein said adapter software allows said adapter system to receive messages from the handheld computer including a message identifier having a three-byte sequence as follows: [120][254][len][J1587 Message], where J1587 message is a standard J1587 formatted message.

20. The vehicle data adapter system as defined in claim 19, wherein said adapter software allows said adapter system to buffer messages.

21. The vehicle data adapter system as defined in claim 13, wherein said adapter software causes messages received from the handheld computer to be unpacked and scheduled for transmission to the vehicle bus whenever a complete message is present and the bus has been inactive for the required amount of time based on the priority of the message.

22. The vehicle data adapter system as defined in claim 19, wherein said adapter software causes the default priority of all adapter transmitted J1587 messages to be 8 unless three consecutive collisions occur whereupon said adapter software shall reschedule the colliding message by randomly selecting a different message priority.

23. The vehicle data adapter system as defined in claim 12, wherein said adapter housing includes a battery supply connected to provide a power supply that is separate from the power supplies for the vehicle bus and the handheld computer and wherein said adapter software monitors the battery voltage at least once every 60 seconds.

24. The vehicle data adapter system as defined in claim 12, wherein the messages are arranged in a queue and said adapter software monitors each message queue and maintains the maximum depth each queue has reached.

25. The vehicle data adapter system as defined in claim 12, wherein said adapter software detects spurious interrupts should they occur.

26. The vehicle data adapter system as defined in claim 12, wherein said adapter software maintains an indication of the available throughput of said adapter microprocessor.

27. The vehicle data adapter system as defined in claim 12, wherein said adapter software transmits a status message at predetermined intervals, said status message contains at least one or more of the following firmware major and minor version, battery voltage, message queue depths, spurious interrupt indication, and the latest throughput value.

28. The vehicle data adapter system as defined in claim 12, further including data link software for monitoring selected information.

29. The vehicle data adapter system as defined in claim 28, wherein the vehicle bus operates on the J1587 data link protocol, said data link software further includes J1587 fault detection and monitors messages on the J1587 datalink.

30. The vehicle data adapter system as defined in claim 28, wherein said data link software supports one or more device MID's supported by the adapter system, wherein said data link software buffers the related fault information for any PID 194 message received from a supported device so that the fault information is accessible to the handheld computer.

31. The vehicle data adapter system as defined in claim 28, wherein said data link software tracks updates as each PID 194 message is broadcast by a supported device and reset when the data link is disconnected from the transmitting device.

32. The vehicle data adapter system as defined in claim 31, wherein said data link software buffers one or more of the following information related to J1587 faults for any device on the data link with a supported MID: PID/SID, FMI, count, active/inactive status.

33. The vehicle data adapter system as defined in claim 32, wherein said data link software records the status of each buffered fault signal, said data link software records changes in the status of each buffered fault signal from active to inactive when no refresh fault signal has been received after a first predetermined time.

34. The vehicle data adapter system as defined in claim 32, wherein said data link software issues a request to trigger an update of all active and inactive faults, said data link software deletes any buffered inactive fault signal if that inactive fault signal has not been refreshed for a second predetermined time longer than said first predetermined time.

35. The vehicle data adapter system as defined in claim 32, wherein said data link software deletes all fault signals should the data link become inactive.

36. The vehicle data adapter system as defined in claim 34, wherein said data link software makes all buffered fault signals and their status available to the handheld computer.

37. The vehicle data adapter system as defined in claim 28, wherein said data link software monitors selected information regarding engine operating conditions and vehicle information relating to the vehicle on which the engine is mounted, said data link software monitors one or more of the following: throttle position, engine load, torque, oil pressure, boost pressure, intake manifold temperature, coolant temperature, coolant level, fuel rate, engine speed, maximum road speed, cruise control set speed, total idle hours, total idle fuel used, total vehicle distance, total vehicle hours, total engine hours, total PTO hours, total fuel used, vehicle identification number, component identification parameter, and software identification.

38. The vehicle data adapter system as defined in claim 28, wherein said data link software monitors parameters that are not broadcast by periodically sending a PID 0 request to obtain them.

39. The vehicle data adapter system as defined in claim 28, further including a battery power source mounted within said adapter housing, said battery source supplying all of the power requirements for said adapter microprocessor and adapter memory independent of the data bus and the handheld computer and wherein said data link software monitors the level of said battery power source, the data link traffic/adapter throughput and an indication of adapter communication error.

40. The vehicle data adapter system as defined in claim 28, wherein said data link software operates to obtain and buffer from the data bus the following static information regarding the engine: engine serial number, software identification, and unit number, said data link software operating to supply said static information for display by the handheld computer.

41. The vehicle data adapter system as defined in claim 12, further includes application software for causing the handheld computer to function to provide one or more of the following functions: display engine operating conditions, display related vehicle information, display fault information and to allow for change of data and for managing the data storage structure.

42. The vehicle data adapter system as defined in claim 41, wherein said application software causes the handheld computer to display one or more of the following engine parameters along with a description of the parameter, value and unit of each parameter: throttle position, engine load, torque, oil pressure, boost pressure, intake manifold temperature, coolant temperature, coolant level, fuel rate, engine speed, and to display one or more of the following vehicle parameters along with a description of the parameter, value and unit of each parameter: maximum road speed, cruise control set speed, total idle hours, total idle fuel used, total vehicle distance, total vehicle hours, total engine hours, total PTO hours, total fuel used, and to display one or more of the following name plate parameters: vehicle identification number, component identification parameter, and software identification.

43. The vehicle data adapter system as defined in claim 42, wherein said application software causes the handheld computer to refresh the displayed engine parameters at regular intervals unless the engine parameter is updated at less frequent intervals whereupon the displayed engine parameters are refreshed when each engine parameter is updated.

44. The vehicle data adapter system as defined in claim 42, wherein said application software causes "No Data" to be displayed in the value field when no engine parameter data is received.

45. The vehicle data adapter system as defined in claim 44, wherein said application software causes the displayed engine parameter data to be inverted should the displayed engine parameter data not be refreshed within a predetermined time.

46. The vehicle data adapter system as defined in claim 45, wherein said application software causes "No Data" to be displayed for all engine operating parameters when the data link is disconnected or no data is received for any parameter.

47. The vehicle data adapter system as defined in claim 41, wherein said application software causes the handheld computer to display the status of the data link as "connected", "slow" or "disconnected".

48. The vehicle data adapter system as defined in claim 41, wherein said application software enables forms to be displayed including a trip form and enables the user of the handheld computer to initiate requests for trip parameters and enables automatic requests for trip parameters when the user requests a trip form and when the data link becomes active after a predetermined period of inactivity.

49. The vehicle data adapter system as defined in claim 48, wherein said application software causes the handheld computer to display "Not Supported" should trip parameters not be received within a predetermined time after user request.

50. The vehicle data adapter system as defined in claim 49, wherein said application software enables the user to enter trip information for storage and display and enables display of the approximate amount of available unused memory and average record size.

51. The vehicle data adapter system as defined in claim 41, wherein said application software enables display of fault signals using engine manufacturer fault codes, if available, and the corresponding MID, PID or SID, and FMI combination.

52. The vehicle data adapter system as defined in claim 51, wherein said application software enables display of information instructing the user regarding how to handle a particular displayed fault.

53. The vehicle data adapter system as defined in claim 52, wherein said application software enables storage and display of the serial number received from a Component Identification PID and the date of the upload used to identify the fault data records.

54. The vehicle data adapter system as defined in claim 41, wherein said application software causes the handheld computer to display manual entry forms to track supplemental information or support equipment that is without an electronic data link.

55. The vehicle data adapter system as defined in claim 41, wherein said application software causes the handheld computer to display manual entry overrides to correct data that are incorrect.

56. The vehicle data adapter system as defined in claim 12 further including application software for managing the data storage function of the handheld computer to allow all data collected and the textual description of faults, parameters, units and status for display and upload to a personal computer including one or more of the following functions:
   a. storing trip information as a record identified by serial number, unit ID, and upload time.,
   b. storing fault information as a record identified by serial number, unit ID, and upload time,
   c. storing data plate information as a record identified by serial number, unit ID, and upload time,
   d. storing manual forms information as a record identified by serial number, unit ID, and entry time,
   e. making data stored on the handheld computer available for upload to a personal computer,
   f. making data stored on the handheld computer available for review using the handheld computer,
   g. allowing the user to delete data a single record at a time, and
   h. storing textual description of PIDs, faults, and units.

57. The vehicle data adapter system as defined in claim 12, further including conduit software for transferring data to and from the handheld computer and a personal computer.

58. The vehicle data adapter system as defined in claim 57, wherein the conduit software is a Windows DLL™ that is called by a Palm™ HotSync™ manager during the handheld computer synchronization events whereby said conduit software transfers data acquired from the handheld computer to the personal computer where it can then be further analyzed.

59. The vehicle data adapter system as defined in claim 58, wherein said conduit software includes one or more of the following features:
   a. a mechanism which allows for the installation of said conduit software on a personal computer,
   b. a mechanism which supports the un-installation of the conduit software from a person computer,
   c. a mechanism that date/time stamps all records stored on the personal computer,
   d. a mechanism that writes data plate information to a comma-separated file which is not stored under a given users' specific directory,
   e. a mechanism that writes engine vehicle data to a comma-separated file which is not stored under a given users' specific directory,
   f. a mechanism that writes engine fault data to a comma-separated file which is not stored under a given users' specific directory,
   g. a mechanism for appending trip or fault incoming data to the respective output file if it already exists without overwriting existing data, and
   h. a mechanism for creating a file when an output file does not exist.

60. A method for creating a data pathway between (1) a data bus on an electronically controlled engine having a first electrical power source which data bus operates in accordance with a predetermined bus protocol to convey multi-byte data messages of varying length and (2) a handheld computer having a second electrical power source separate from the first which operates in accordance with a data protocol which buffers received bytes of data for access by application software without keeping track of when the bytes are received thereby losing indications of the start and stop of multi-byte data messages, comprising
   a. interconnecting the data bus and the handheld computer to form the data pathway external to both the data bus and the handheld computer to allow multi-byte data messages of varying length to pass between the handheld computer and the data bus,
   b. intercepting the messages conveyed on the data pathway from the data bus to the handheld computer at a point external to the data bus and the handheld computer,
   c. buffering the data contained in the intercepted messages external to the data bus and the handheld computer,
   d. processing the buffered data to determine the start and stop of messages received from the data bus,
   e. adding message identifiers to the buffered data as the messages are conveyed to the handheld computer to identify the start and stop of each message,
   f. performing steps (b) through (e), and
   g. unpacking data messages received from the handheld computer and scheduling the data messages for transmission to the vehicle bus whenever a complete message is present and the bus has been inactive for the required amount of time based on the priority of the message.

61. A method for creating a data pathway as defined by claim 60, further including the step of providing a wireless link in the data pathway to cause the data to flow wirelessly at least over part of the data pathway.

62. A method for creating a data pathway as defined by claim 60, wherein step (d) includes the step of determining the interbyte timing ratio between distinct messages to determine the start and stop of messages conveyed from the data bus.

63. A method for creating a data pathway as defined by claim 60, wherein step (e) includes the step of adding a delimiting header block having a synchronization sequence and a message length to each data message being conveyed to the handheld computer over the data pathway.

64. A method for creating a data pathway as defined by claim 63, wherein step (e) further includes the step of forming a delimiting header block including a three-byte sequence: [112][254][len][J1587Message] where J1587Message is a standard J1587 formatted message.

65. A method for creating a data pathway as defined by claim 60, wherein the signal levels of the data messages appropriate for transmission by the data bus and for processing by said handheld computer are respectively different and wherein the method further includes the step of converting the signal levels of the data messages to the appropriate levels as the data pass over the data pathway between the vehicle bus and the handheld computer.

66. The vehicle data system defined in claim 1, wherein said operating system software for said handheld computer is a PALM™ operating system 2.0 or higher.

67. The vehicle data system defined in claim 6, wherein the engine bus employs a CAN 2.0B data link.

68. The vehicle data system defined in claim 1, further including application configuration software for creating a customized database of selected vehicle parameters based on a specific vehicle application.

69. A vehicle data adapter system for creating a data pathway between a bus connector of a data bus on an electronically controlled engine operating in accordance with a predetermined bus protocol to convey data messages and a handheld computer which operates in accordance with a data protocol which is different from the vehicle bus protocol wherein the handheld computer includes an external data port which is physically incompatible with the bus connector of the data bus, comprising a. an adapter housing external to the handheld computer, b. an adapter microprocessor included in the data pathway between the data bus and the handheld computer, said adapter microprocessor being mounted within said adapter housing, c. adapter memory for storing adaptor software for implementation by said microprocessor to perform the functions of the adapter system including protocol conversion of vehicle data transferred between the data bus and the handheld computer, d. a data port connector for connecting the data pathway with the external data port of the handheld computer to allow vehicle data to be transferred to and from the handheld computer, e. a bus compatible connector for connecting the data pathway with the bus included in the data pathway for connection with the bus connector of the vehicle bus to allow vehicle data to be transferred to and from the vehicle bus, and f. data link software for monitoring selected information, wherein said adapter microprocessor operates to convert the vehicle data between the bus protocol and the data protocol of said handheld computer by determining the start and stop of messages received from the data bus and said adapter microprocessor further operates to add message identifiers to the vehicle data conveyed to the handheld computer through said external data port, whereby the amount of processing that the handheld computer is required to undertake for data monitoring and extraction from the data bus is minimized.

70. A vehicle data adapter system for creating a data pathway between a bus connector of a data bus on an electronically controlled engine operating in accordance with a predetermined bus protocol to convey data messages and a handheld computer which operates in accordance with a data protocol which is different from the vehicle bus protocol wherein the handheld computer includes an external data port which is physically incompatible with the bus connector of the data bus, comprising a. an adapter housing external to the handheld computer, b. an adapter microprocessor included in the data pathway between the data bus and the handheld computer, said adapter microprocessor being mounted within said adapter housing, c. adapter memory for storing adaptor software for implementation by said microprocessor to perform the functions of the adapter system including protocol conversion of vehicle data transferred between the data bus and the handheld computer, d. a data port connector for connecting the data pathway with the external data port of the handheld computer to allow vehicle data to be transferred to and from the handheld computer, e. a bus compatible connector for connecting the data pathway with the bus included in the data pathway for connection with the bus connector of the vehicle bus to allow vehicle data to be transferred to and from the vehicle bus, and f. an application software for causing the handheld computer to function to provide one or more of the following functions: display engine operating conditions, display related vehicle information, display fault information and to allow for change of data and for managing the data storage structure, wherein said adapter microprocessor operates to convert the vehicle data between the bus protocol and the data protocol of said handheld computer by determining the start and stop of messages received from the data bus and said adapter microprocessor further operates to add message identifiers to the vehicle data conveyed to the handheld computer through said external data port, whereby the amount of processing that the handheld computer is required to undertake for data monitoring and extraction from the data bus is minimized.

71. A vehicle data adapter system for creating a data pathway between a bus connector of a data bus on an electronically controlled engine operating in accordance with a predetermined bus protocol to convey data messages and a handheld computer which operates in accordance with a data protocol which is different from the vehicle bus protocol wherein the handheld computer includes an external data port which is physically incompatible with the bus connector of the data bus, comprising a. an adapter housing external to the handheld computer, b. an adapter microprocessor included in the data pathway between the data bus and the handheld computer, said adapter microprocessor being mounted within said adapter housing, c. adapter memory for storing adaptor software for implementation by said microprocessor to perform the functions of the adapter system including protocol conversion of vehicle data transferred between the data bus and the handheld computer, d. a data port connector for connecting the data pathway with the external data port of the handheld computer to allow vehicle data to be transferred to and from the handheld computer, e. a bus compatible connector for connecting the data pathway with the bus included in the data pathway for connection with the bus connector of the vehicle bus to allow vehicle data to be transferred to and from the vehicle bus, and f. a conduit software for transferring data to and from the handheld computer and a personal computer, wherein said adapter microprocessor operates to convert the vehicle data between the bus protocol and the data protocol of said handheld computer by determining the start and stop of messages received from the data bus and said adapter microprocessor further operates to add message identifiers to the vehicle data conveyed to the handheld computer through said external data port, whereby the amount of processing that the handheld computer is required to undertake for data monitoring and extraction from the data bus is minimized.

72. The method for creating a data pathway as defined by claim 60, further including the step of providing an electrical power source separate from the first and second power sources, whereby the amount of processing that the handheld computer is required to undertake for data monitoring and extraction from the data bus is reduced without employing the electrical power sources of either the handheld computer or the engine.

73. A vehicle data adapter system for creating a data pathway between a bus connector of a data bus on an electronically controlled engine operating in accordance with a predetermined bus protocol to convey data messages and a handheld computer which operates in accordance with a data protocol which is different from the vehicle bus protocol wherein the handheld computer includes an external data port which is physically incompatible with the bus connector of the data bus, comprising:
   a. an adapter housing external to the handheld computer,
   b. a data port connector for connecting the data pathway with the external data port of the handheld computer to allow vehicle data to be transferred to and from the handheld computer, and
   c. a bus compatible connector for connecting the data pathway with the bus included in the data pathway for connection with the bus connector of the vehicle bus to allow vehicle data to be transferred to and from the vehicle bus,
   wherein the signal levels of the vehicle data appropriate for transmission by the vehicle bus and for processing by said handheld computer are respectively different and wherein the adapter system further includes level adjustment means for converting the signal levels of the vehicle data to the appropriate levels as the vehicle data passes over the data pathway between the vehicle bus and the handheld computer.

74. A vehicle data adapter system for creating a data pathway between a bus connector of a data bus on an electronically controlled engine operating in accordance with a predetermined bus protocol to convey data messages and a handheld computer which operates in accordance with a data protocol which is different from the vehicle bus protocol wherein the handheld computer includes an external data port which is physically incompatible with the bus connector of the data bus, comprising:
   a. an adapter housing external to the handheld computer,
   b. a data port connector for connecting the data pathway with the external data port of the handheld computer to allow vehicle data to be transferred to and from the handheld computer, and
   c. a bus compatible connector for connecting the data pathway with the bus included in the data pathway for connection with the bus connector of the vehicle bus to allow vehicle data to be transferred to and from the vehicle bus,
   wherein the system further comprises data link software for monitoring selected information.

75. A vehicle data adapter system for creating a data pathway between a bus connector of a data bus on an electronically controlled engine operating in accordance with a predetermined bus protocol to convey data messages and a handheld computer which operates in accordance with a data protocol which is different from the vehicle bus protocol wherein the handheld computer includes an external data port which is physically incompatible with the bus connector of the data bus comprising:
   a. an adapter housing external to the handheld computer,
   b. a data port connector for connecting the data pathway with the external data port of the handheld computer to allow vehicle data to be transferred to and from the handheld computer, and
   c. a bus compatible connector for connecting the data pathway with the bus included in the data pathway for connection with the bus connector of the vehicle bus to allow vehicle data to be transferred to and from the vehicle bus,
   wherein the system further includes application software for causing the handheld computer to function to provide one or more of the following functions: display engine operating conditions, display related vehicle information, display fault information and to allow for change of data and for managing the data storage structure.

\* \* \* \* \*